(12) United States Patent
Choi et al.

(10) Patent No.: US 11,765,486 B2
(45) Date of Patent: Sep. 19, 2023

(54) VISION SENSOR AND IMAGE PROCESSING DEVICE INCLUDING THE SAME

(71) Applicant: SAMSUNG ELECTRONICS CO., LTD., Suwon-si (KR)

(72) Inventors: Seungnam Choi, Hwaseong-si (KR); Jongwoo Bong, Seoul (KR); Junseok Kim, Hwaseong-si (KR); Yunjae Suh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 17/494,243

(22) Filed: Oct. 5, 2021

(65) Prior Publication Data

US 2022/0239859 A1 Jul. 28, 2022

(30) Foreign Application Priority Data

Jan. 27, 2021 (KR) .......................... 10-2021-0011796

(51) Int. Cl.
*H04N 25/771* (2023.01)
(52) U.S. Cl.
CPC ................................ *H04N 25/771* (2023.01)
(58) Field of Classification Search
CPC .. H04N 25/771; H04N 5/37206; H04N 25/40; H04N 5/341; H04N 25/77; H04N 5/3745
See application file for complete search history.

(56) References Cited

U.S. PATENT DOCUMENTS

| | | | |
|---|---|---|---|
| 9,936,132 B2 | 4/2018 | Yoon et al. | |
| 10,516,841 B2 | 12/2019 | Kim et al. | |
| 11,272,133 B1 * | 3/2022 | Zhang | H04N 25/772 |
| 2019/0364230 A1 | 11/2019 | Yeo et al. | |
| 2020/0005468 A1 | 1/2020 | Paul et al. | |
| 2020/0128205 A1 | 4/2020 | Sakakibara et al. | |
| 2020/0154064 A1 | 5/2020 | Berner et al. | |
| 2020/0260033 A1 | 8/2020 | Yeo et al. | |

* cited by examiner

*Primary Examiner* — Nicholas G Giles
(74) *Attorney, Agent, or Firm* — Sughrue Mion, PLLC

(57) ABSTRACT

A vision sensor including a plurality of pixels configured to sense intensity of incident light, and to output request signals representing an occurrence status of an event; and an event detection circuit configured to generate event data including information about a pixel at which the event occurs, based on the request signals, wherein each pixel of the plurality of pixels includes: a photoelectric conversion device configured to generate a current corresponding to the incident light; a current-to-voltage converter configured to generate a voltage corresponding to the current; an amplifier configured to amplify a variation amount of the generated voltage to generate an output voltage; an event storage configured to generate an event signal corresponding to a comparison between the output voltage and a threshold voltage, and to hold the event signal using cross-coupled transistors; and an output logic configured to output a request signal based on the event signal.

20 Claims, 19 Drawing Sheets

VISION SENSOR AND IMAGE PROCESSING DEVICE INCLUDING THE SAME

CROSS-REFERENCE TO RELATED APPLICATION

This application is based on and claims priority under 35 U.S.C. § 119 to Korean Patent Application No. 10-2021-0011796, filed on Jan. 27, 2021, in the Korean Intellectual Property Office, the disclosure of which is incorporated by reference herein in its entirety.

BACKGROUND

1. Field

The inventive concept relates to a vision sensor, and more particularly, to a vision sensor including a latch-type event storage and an image processing device including the vision sensor.

2. Description of Related Art

A human-computer interaction (HCl) between a human and a computer may be implemented and operate based on a user interface. Various user interfaces for recognizing a user input may provide a natural interaction between a human and a computer. Various sensors may be used for recognizing a user input.

When an event occurs, for example, an intensity variation of light, a vision sensor, for example a dynamic vision sensor, may generate information about the event, for example an event signal, and transfer the event signal to a processor.

SUMMARY

Provided are a vision sensor including a latch-type event storage where a comparator is merged with an event storage.

Additional aspects will be set forth in part in the description which follows and, in part, will be apparent from the description, or may be learned by practice of the presented embodiments.

In accordance with an aspect of the disclosure, a vision sensor includes a pixel array including a plurality of pixels configured to sense intensity of incident light, and to output request signals representing an occurrence status of an event; and an event detection circuit configured to generate event data including information about a pixel at which the event occurs, based on the request signals, wherein each pixel of the plurality of pixels includes: a photoelectric conversion device configured to generate a current corresponding to the incident light; a current-to-voltage converter configured to generate a voltage corresponding to the current corresponding to the incident light; an amplifier configured to amplify a variation amount of the generated voltage from a particular time to generate an output voltage; an event storage configured to generate an event signal corresponding to a comparison result obtained by comparing the output voltage with a threshold voltage, and to hold the event signal using cross-coupled transistors; and an output logic configured to output a request signal based on the event signal.

In accordance with an aspect of the disclosure, a vision sensor includes a plurality of pixels, wherein each pixel of the plurality of pixels includes: a photoelectric conversion device configured to generate a current corresponding to incident light, a current-to-voltage converter configured to generate a voltage corresponding to the current corresponding to the incident light; an amplifier configured to amplify a variation amount of the generated voltage from a particular time to generate an output voltage; and a first event storage configured to generate a first event signal corresponding to a first comparison result obtained by comparing the output voltage with a first threshold voltage, and to hold the first event signal, and wherein the first event storage includes: a first transistor configured to operate based on the output voltage; a second transistor serially connected to the first transistor and configured to operate based on a first control signal and to output the first event signal to a first node; a first current source connected to the first node and configured to provide a current corresponding to the first threshold voltage; and a plurality of first cross-coupled transistors connected to the first node and configured to hold the first event signal.

In accordance with an aspect of the disclosure, an image processing device includes a vision sensor configured to output a plurality of event signals respectively corresponding to pixels at which events occur based on a movement of an object, from among a plurality of pixels included in a pixel array; and a processor configured to process the plurality of event signals output from the vision sensor and to detect the movement of the object, wherein each of the plurality of pixels includes: a photoelectric conversion device configured to generate a current corresponding to incident light; an amplifier configured to amplify a variation amount of a voltage corresponding to the current to generate an output voltage; an event storage configured to generate an event signal corresponding to a comparison result obtained by comparing the output voltage with a threshold voltage, and to hold the event signal using cross-coupled transistors; and an output logic configured to output a request signal based on the event signal.

In accordance with an aspect of the disclosure, a pixel back-end circuit, includes a comparator configured to output an event signal a result of a comparison between a threshold voltage and an output voltage obtained based on light incident on a pixel; an event storage configured to store the event signal, wherein the comparator includes a first plurality of transistors and a first current source, and wherein the event storage includes a second plurality of transistors, the first current source, and a second current source.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION OF THE EMBODIMENTS

Figure 1:
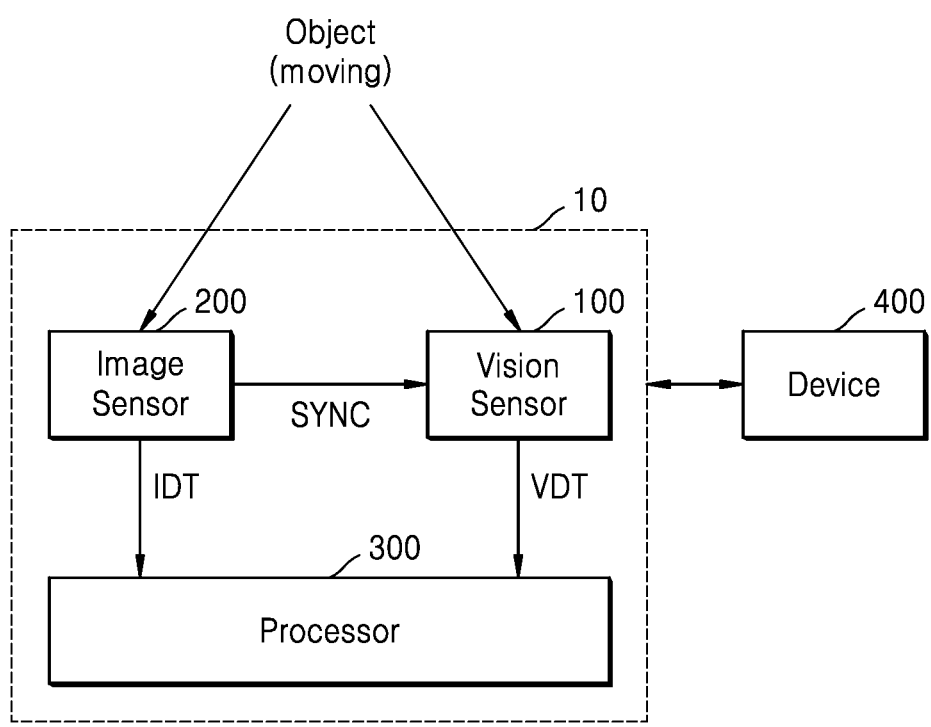
FIG. 1 is a block diagram illustrating an image processing device according to an embodiment.

FIG. 1 is a block diagram illustrating an image processing device 10 according to an embodiment.

Referring to FIG. 1, the image processing device 10 may include a vision sensor 100, an image sensor 200, and a processor 300. The image processing device 10 according to an embodiment may be equipped in an electronic device having an image or light sensing function. For example, the image processing device 10 may be equipped in electronic devices such as cameras, smartphones, wearable devices, Internet of things (IoT) devices, tablet personal computers (PCs), personal digital assistants (PDAs), portable multimedia players (PMPs), navigation devices, drones, and advanced drivers assistance systems (ADASs). Also, the image processing device 10 may be provided as a component in vehicles, furniture, manufacturing equipment, doors, various measurement devices, etc.

The vision sensor 100 may sense an intensity variation of light incident thereon to output an event signal. The vision sensor 100 may include a dynamic vision sensor which outputs event signals on the basis of pixels where an intensity variation of light is sensed, namely, pixels where an event occurs. The intensity variation of the light may be based on the movement of an object photographed by the vision sensor 100, or may be based on the movement of the vision sensor 100 or the image processing device 10. The vision sensor 100 may periodically or aperiodically transfer pieces of vision sensor data VDT including event signals to the processor 300.

The vision sensor 100 may generate a time stamp for allowing an image frame, generated by the image sensor 200, to match an event signal generated by the vision sensor 100 on the basis of a synchronization signal SYNC received from the image sensor 200 and may transfer the vision sensor data VDT including the generated time stamp to the processor 300. The time stamp may include information about a time at which the image sensor 200 is exposed, a time at which the image frame is generated, or a time at which the event signal of the vision sensor 100 is generated. The time stamp may include a reference time stamp, which increases a predetermined value when an internal trigger signal is generated, and a sub time stamp which increases the predetermined value when an event signal is generated.

Also, the vision sensor 100 may output a device signal for synchronizing the vision sensor 100 with external devices including the image sensor 200 by using the synchronization signal SYNC received from the image sensor 200 or an internal signal of the vision sensor 100. The vision sensor 100 may output a plurality of device synchronization signals and may individually control the device synchronization signals.

The image sensor 200 may convert an optical signal of an object incident thereon into an electrical signal by using an optical lens and may generate and output image data IDT on the basis of the electrical signal. The image sensor 200 may include, for example, a pixel array including a plurality of pixels arranged two-dimensionally and a readout circuit, and the pixel array may convert optical signals, received thereby, into electrical signals. The pixel array may be implemented with a photoelectric conversion device such as charge coupled device (CCD) or complementary metal oxide semiconductor (CMOS), and moreover, may be implemented with various kinds of photoelectric conversion devices. The readout circuit may generate raw data on the basis of the electrical signal provided from the pixel array and may output, as the image data IDT, raw data on which preprocessing such as removing of bad pixel or raw data has been performed. The image sensor 200 may be implemented as a semiconductor chip or package including a pixel array and a readout circuit.

The image sensor 200 may generate the synchronization signal SYNC, which is to be transferred to the vision sensor 100, in order to synchronize the vision sensor 100 with the image sensor 200. The synchronization signal SYNC may be generated based on shutter signal information, readout signal information, or image frame information about the image sensor 200.

The processor 300 may perform image processing on the image data IDT provided from the image sensor 200. For example, the processor 300 may include image processing, such as noise removal, brightness adjustment, sharpness adjustment, and image processing, for example, converting image data of a Bayer pattern into a YUV or RGB format, for enhancing image quality. The processor 300 may process vision sensor data VDT received from the vision sensor 100 and may detect the movement of an object, or for example the movement of an object in an image recognized by the image processing device 10, on the basis of an event signal included in the vision sensor data VDT.

Also, the processor 300 may allow an image frame, included in the image data IDT provided from the image sensor 200, to match the vision sensor data VDT received from the vision sensor 100 by using the time stamp and pieces of synchronization signal information. The processor 300 may include an application specific integrated circuit (ASIC), a field-programmable gate array (FPGA), a dedicated microprocessor, a microprocessor, and a general-purpose processor. In an embodiment, the processor 300 may include an application processor or an image signal processor.

Each of the vision sensor 100, the image sensor 200, and the processor 300 may be implemented as an integrated circuit (IC). For example, each of the vision sensor 100, the image sensor 200, and the processor 300 may be implemented as a separate semiconductor chip. In embodiments, the vision sensor 100, the image sensor 200, and the processor 300 may be implemented as a single chip. For example, each of the vision sensor 100, the image sensor 200, and the processor 300 may be implemented as a system on chip (SoC).

The image processing device 10 may control an external device 400 and may collect data from the external device 400. The image processing device 10 may allow the image frame to match the data collected from the external device 400 by using the time stamp. The external device 400 may include an acceleration sensor, an inertia measurement unit (IMU), a gyro sensor, an infrared (IR) light-emitting diode (LED), and a flash light.

The acceleration sensor may be a sensor for measuring an acceleration of a moving object or an intensity of an impact and may process an output signal to measure dynamic forces such as an acceleration, a vibration, and an impact of an object. The gyro sensor may be a sensor which is used to measure a position and set a direction by using a mechanical motion. The IR LED may be a device which is for capturing an image at a position where there is no light and is used for closed-circuit televisions (CCTVs) and the like.

The IMU may use an accelerator, a tachometer, a magnetometer, or a combination thereof, and recently, may act as a direction sensor in many consumer products such as portable phones and cameras. The IMU may sense a linear acceleration by using one or more accelerators and may sense a rotational speed by using one or more gyroscopes, and depending on the case, may include a magnetometer. In a general configuration, each of an accelerator, a gyroscope, and a magnetometer may be provided for every one axis with respect to three axes such as a pitch, a roll, and a yaw.

Figure 2:
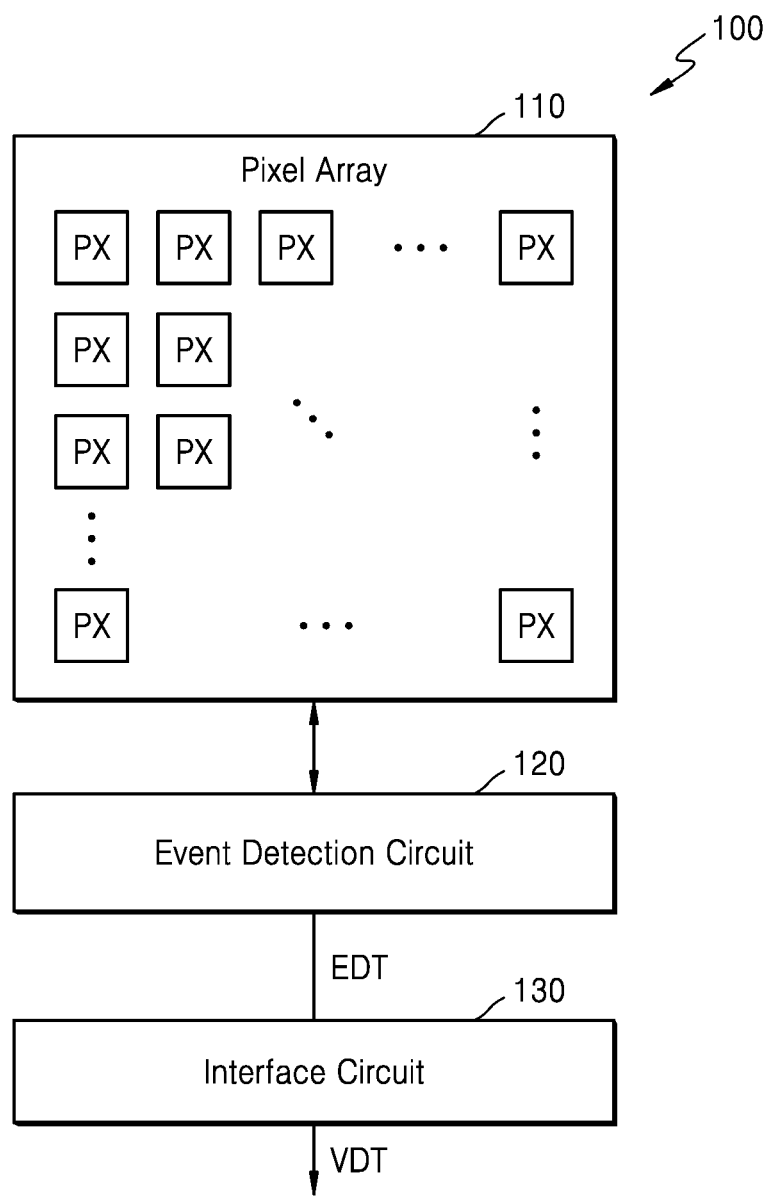
FIG. 2 is a block diagram illustrating a vision sensor according to an embodiment.

FIG. 2 is a block diagram illustrating a vision sensor 100 according to an embodiment. In detail, FIG. 2 is a block diagram illustrating the vision sensor 100 of FIG. 1.

Referring to FIGS. 1 and 2, the vision sensor 100 may include a pixel array 110, an event detection circuit 120, and an interface circuit 130.

The pixel array 110 may include a plurality of pixels PX which are arranged in a matrix form. Each of the plurality of pixels PX may sense events where the intensity of received light increases or decreases. For example, each of the plurality of pixels PX may be connected to the event detection circuit 120 through a column line extending in a column direction and a row line extending in a row direction. A signal indicating the occurrence of an event and polarity information about the event, for example whether an event is an "on event" where the intensity of light increases, or is an "off event" where the intensity of light decreases, may be output to the event detection circuit 120 by a pixel PX where the event occurs. In embodiments, the signal indicating the occurrence or not of an event may be a signal indicating an occurrence status of an event.

The event detection circuit 120 may read events from the pixel array 110 and may process the events. The event detection circuit 120 may generate event data EDT which may include at least one of polarity information about an event which occurs, an address of a pixel where the event occurs, and a time stamp. In embodiments, a time stamp may be included in the event data EDT, or may be separate from the event data EDT, as desired. The event detection circuit 120 may process events, occurring in the pixel array 110, by pixel units, by pixel group units including a plurality of pixels, by column units, or by frame units.

The interface circuit 130 may receive the event data EDT and the time stamp and may transfer vision sensor data VDT to the processor 300 on the basis of a predetermined protocol. The interface circuit 130 may pack pieces of event data EDT and the time stamp by individual signal units, packet units, or frame units on the basis of a predetermined protocol to generate the vision sensor data VDT and may transfer the vision sensor data VDT to the processor 300. For example, the interface circuit 130 may include one of an address event representation (AER) interface, a mobile industry processor interface (MIPI), and a parallel interface.

The interface circuit 130 may output a packet, including at least one of pieces of event data EDT and a time stamp, as the vision sensor data VDT. The packet may include a time stamp, an address, and polarity information included in the event data EDT, and the arrangement order thereof is not limited thereto. A header indicating the start of the packet may be added to a fore portion of the packet, and a tail indicating an end of the packet may be added to a latter portion of the packet. The packet may include at least one event signal.

Figure 3:
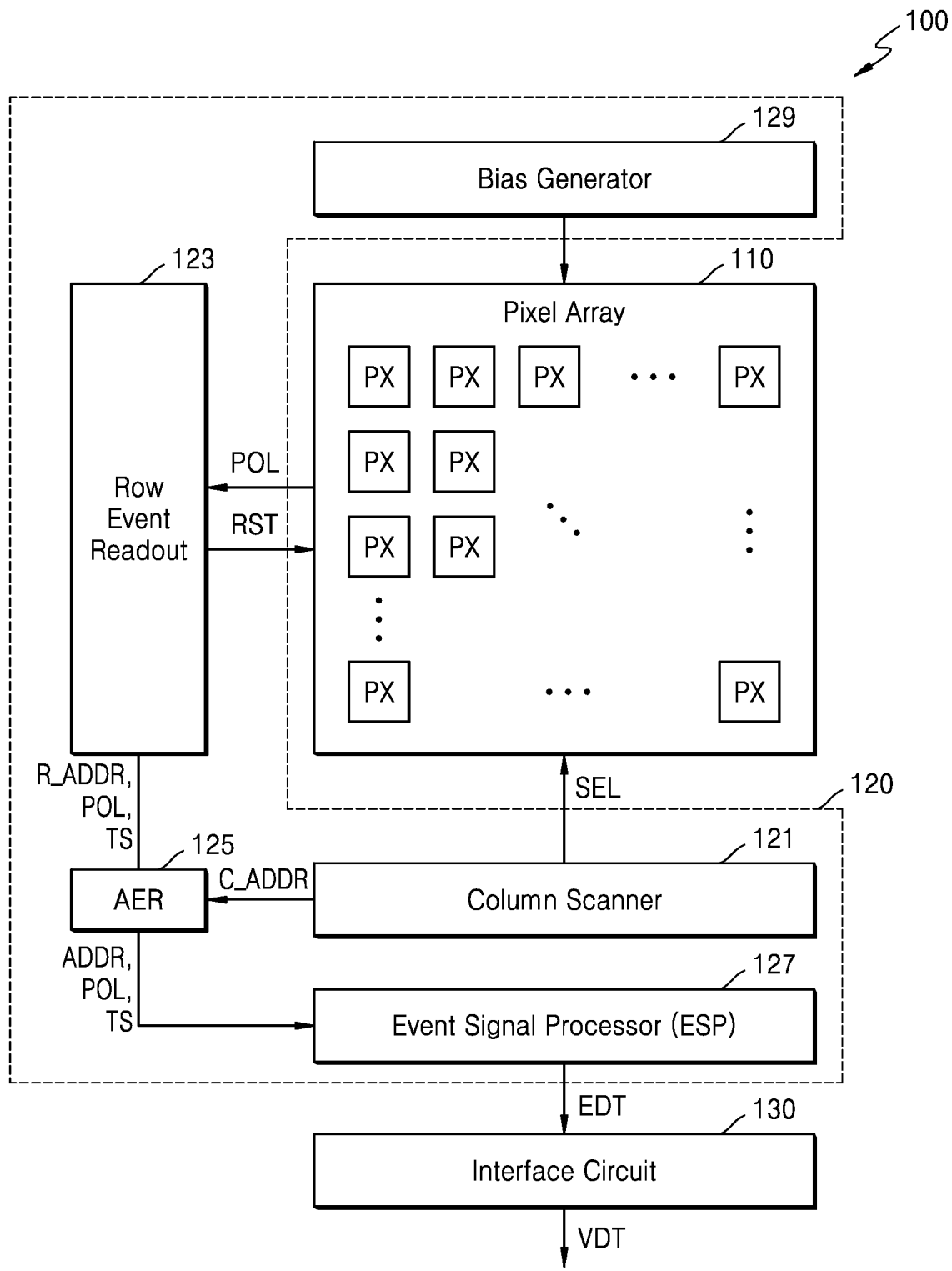
FIG. 3 is a block diagram illustrating in detail the vision sensor of FIG. 2 according to an embodiment.

FIG. 3 is a block diagram illustrating in detail the vision sensor 100 of FIG. 2.

Referring to FIGS. 2 and 3, a vision sensor 100 may include a pixel array 110, an event detection circuit 120, and an interface circuit 130, and the event detection circuit 120 may include a column scanner circuit 121, a row event readout circuit 123, an AER 125, an event signal processor (ESP) 127, and a bias generator 129. The vision sensor 100 may further include a plurality of elements such as an event speed controller which controls an event detection speed. The pixel array 110 and the interface circuit 130 have been described above with reference to FIG. 2, and thus, repeated descriptions thereof are omitted.

The column scanner circuit 121 may scan a plurality of pixels PX of the pixel array 110 by column units. In detail, the column scanner circuit 121 may transfer a selection signal SEL to a column, which is to be scanned, of a plurality of columns of the pixel array 110 to scan the pixels PX included in a column which is to be scanned.

The pixels PX included in a column which is to be scanned, may transfer polarity information POL, representing the occurrence or not of an event where the intensity of light increases or decreases, to the row event readout circuit 123 in response to the selection signal SEL. The polarity information POL may include information about an on event where the intensity of light increases and an off event where the intensity of light decreases. In some embodiments, the polarity information POL may consist of 1 bit, including information about the occurrence or not of the on event, and 1 bit including information about the occurrence or not of the off event. For example, when a value representing the occurrence of an event is set to 1, both of the bit representing the on event and the bit representing the off event may not be '1' simultaneously. However, both of the bit representing the on event and the bit representing the off event may be '0' simultaneously, for example when an event does not occur. A method of implementing the polarity information POL is not limited thereto and may be implemented as various methods. Also, the column scanner circuit 121 may generate a column address C_ADDR of a pixel PX where an event occurs.

The row event readout circuit 123 may receive the polarity information POL from the pixels PX included in the column which is to be scanned. The row event readout circuit 123 may transfer a reset signal RST to a pixel PX where an event occurs, for example an on event or an off event, in response to the polarity information POL. The pixel PX where the event occurs may be reset in response to the reset signal RST. Also, the row event readout circuit 123 may generate a row address R_ADDR of the pixel PX where the event occurs, on the basis of the received polarity information POL. Also, the row event readout circuit 123 may generate a time stamp TS including information about a time at which the event occurs, on the basis of the polarity information POL. In some embodiments, the time stamp TS may be generated by a time stamper included in the row event readout circuit 123. For example, the time stamper may be implemented by using a timetick generated by units of several to tens of microseconds (is), or millionths of a second.

The AER 125 may receive the row address R_ADDR, the polarity information POL, and the time stamp TS from the row event readout circuit 123 and may receive the column address C_ADDR from the column scanner circuit 121. Also, the AER 125 may generate an address ADDR of the pixel PX where the event occurs, on the basis of the row address R_ADDR and the column address C_ADDR. Also, the AER 125 may transfer the address ADDR, the polarity information POL, and the time stamp TS to the ESP 127.

The ESP 127 may generate the event data EDT on the basis of the address ADDR, the polarity information POL, and the time stamp TS each received from the AER 125. In an embodiment, the ESP 127 may remove a noise event and may generate the event data EDT of valid events. For example, when the number of events occurring for a certain time is less than a predetermined threshold value, the ESP 127 may determine the events as noise and may not generate the event data EDT of the noise event.

The bias generator 129 may generate a voltage provided to the pixel array 110. For example, the bias generator 129 may generate threshold voltages or bias voltages used to detect an on event and an off event in the pixel PX. The bias generator 129 may vary a voltage level of each of the threshold voltages provided to the pixels PX and may differently vary a voltage level of a corresponding threshold voltage for each of the pixels PX.

Figure 4:
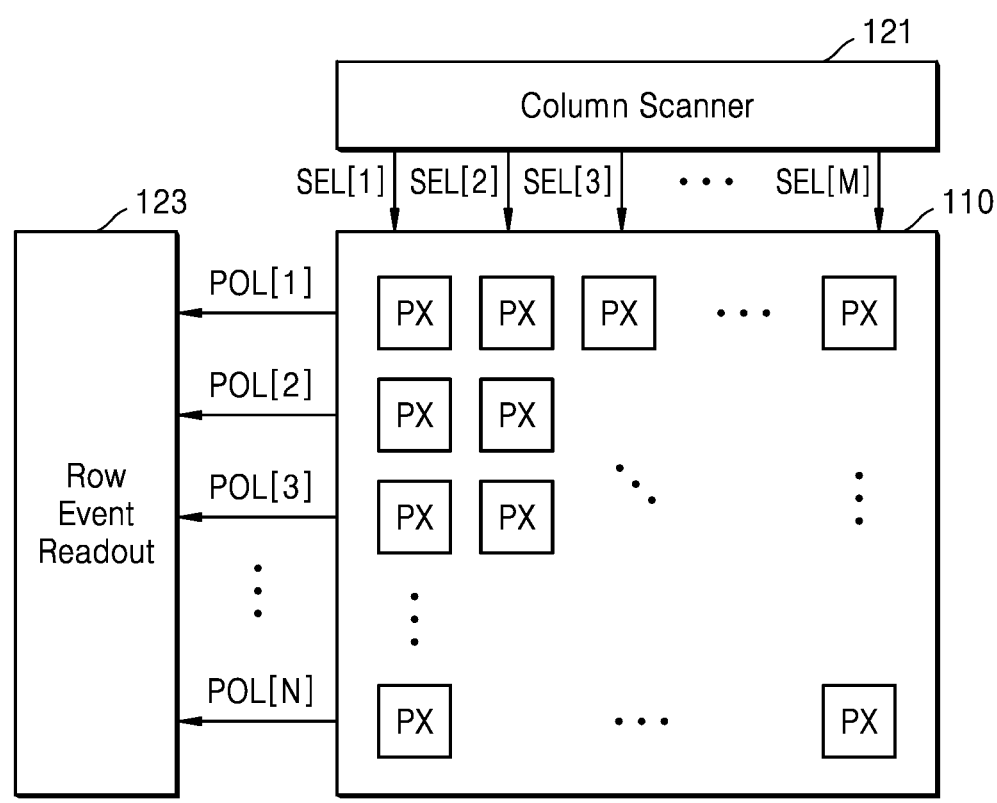
FIG. 4 is a conceptual diagram for describing an operation of generating polarity information by using a vision sensor according to an embodiment.

FIG. 4 is a conceptual diagram for describing an operation of generating polarity information by using a vision sensor according to an embodiment. In detail, FIG. 4 is a conceptual diagram for describing an operation of generating the polarity information POL about the vision sensor 100 of FIG. 3.

Referring to FIGS. 3 and 4, a column scanner circuit 121 may scan a pixel array 110 by column units. In detail, the column scanner circuit 121 may scan the pixel array 110 by column units by using a plurality of selection signals SEL[1] to SEL[M] respectively corresponding to M (where M is a positive integer) number of columns. The selection signals SEL[1] to SEL[M] may have an active level, for example logic high, representing a column selection and an inactive level, for example logic low, representing a column non-selection. The column scanner circuit 121 may sequentially shift the selection signals SEL[1] to SEL[M] to an active level to scan the pixel array 110 by column units. However, the present disclosure is not limited thereto, and the column scanner circuit 121 may be implemented to randomly shift the selection signals SEL[1] to SEL[M] to the active level.

When a selection signal for a certain column is shifted to the active level, each of N (where N is a positive integer) number of pixels PX included in a corresponding column may provide the row event readout circuit 123 with polarity information representing the occurrence or not of an event. In detail, the N pixels PX may respectively transfer pieces of polarity information POL[1] to POL[N], corresponding to the N pixels PX, to the row event readout circuit 123. The pieces of polarity information POL[1] to POL[N] may have the active level, for example logic low, representing the occurrence of an event and the inactive level, for example logic high, representing the nonoccurrence of an event. In some embodiments, each of the pieces of polarity information POL[1] to POL[N] may include first polarity information representing the occurrence or not of an on event and second polarity information representing the occurrence or not of an off event.

The row event readout circuit 123 may receive the pieces of polarity information POL[1] to POL[N] about the N pixels PX, provide a reset signal RST to a pixel PX where an event occurs, on the basis of the pieces of polarity information POL[1] to POL[N], and generate a row address R_ADDR and a time stamp TS.

Figure 5:
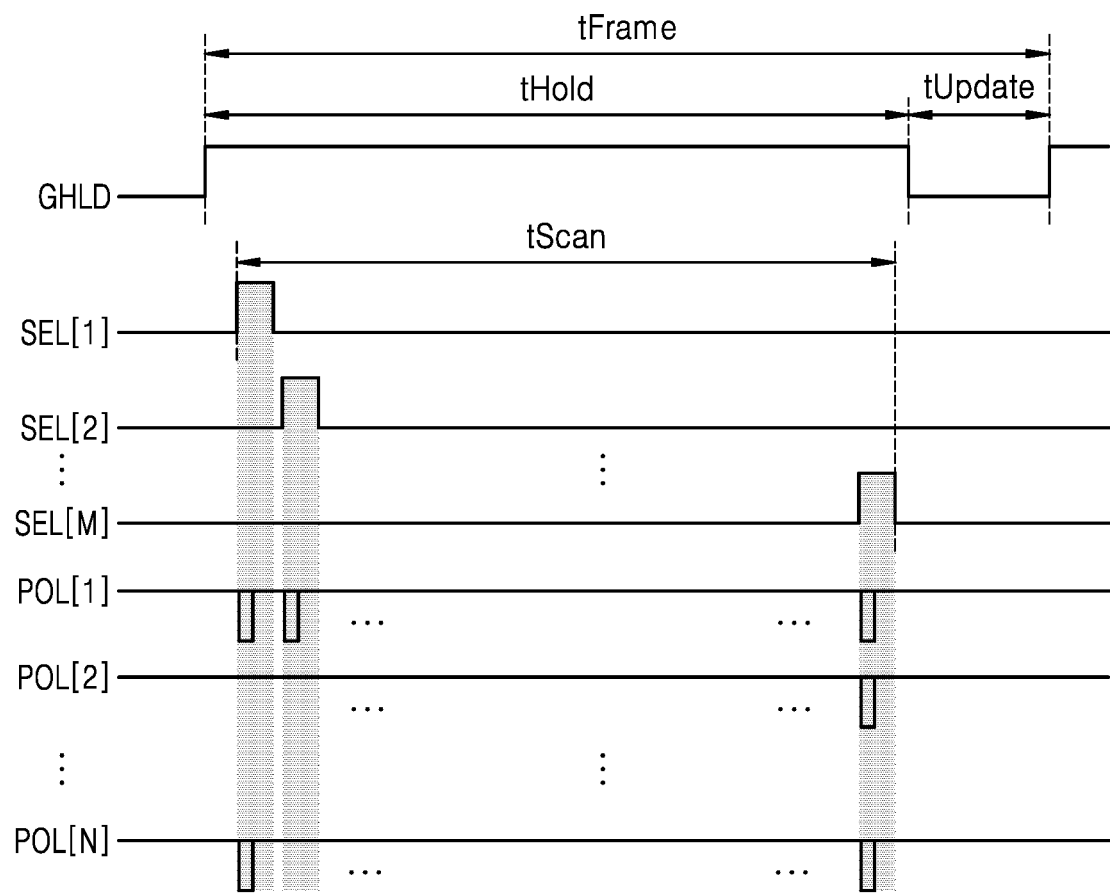
FIG. 5 is a timing diagram for describing an operation of generating polarity information by using a vision sensor according to an embodiment.

FIG. 5 is a timing diagram for describing an operation of generating polarity information by using a vision sensor according to an embodiment. In detail, FIG. 5 is a timing diagram for describing a polarity information generating operation of FIG. 4.

Referring to FIGS. 4 and 5, the pixels PX of the pixel array 110 may repeatedly perform a series of operations at every frame period tFrame corresponding to each frame. The frame period tFrame may include a global hold period tHold and an update period tUpdate, each of the pixels PX may perform a global hold operation in the global hold period tHold, and an event update operation may be performed in an update period tUpdate.

The global hold operation may be an operation of holding, by using the pixel PX, an event signal recorded in the pixel PX and may prevent the recording of a new event even when the new event occurs in the global hold period tHold. The event update operation may denote an operation of recording the new event, occurring in the global hold period tHold, in the pixel PX.

The column scanner circuit 121 may sequentially shift a plurality of selection signals, for example first to $M^{th}$ selection signals, SEL[1] to SEL[M] to the active level in a scan period tScan included in the global hold period tHold to scan the pixel array 110 by column units. For example, referring to FIG. 5, the column scanner circuit 121 may shift the first selection signal SEL[1] to the active level for a scan time corresponding to a first column, and when the scan time corresponding to the first column elapses, the column scanner circuit 121 may shift the first selection signal SEL[1] to the inactive level. Also, the column scanner circuit 121 may shift the second selection signal SEL[2] to the active level for a scan time corresponding to a second column, and when the scan time corresponding to the second column elapses, the column scanner circuit 121 may shift the second selection signal SEL[2] to the inactive level. The column scanner circuit 121 may repeat such operations up to an $M^{th}$ column.

When a selection signal for a certain column is shifted to the active level, N number of pixels PX included in a corresponding column may provide the row event readout circuit 123 with pieces of polarity information POL[1] to POL[N] representing the occurrence or not of an event. Also, a pixel PX where an event occurs may receive a reset signal RST from the row event readout circuit 123 and may be reset based on the reset signal RST.

For example, referring to FIG. 5, when the first selection signal SEL[1] for the first column is shifted to the active level, a pixel PX, where an event occurs, of the pixels PX of the first column may output pieces of polarity information POL[1] and POL[N] having the active level, for example a low level. Also, when the second selection signal SEL[2] for the second column is shifted to the active level, a pixel PX, where an event occurs, of the pixels PX of the second column may output the polarity information POL[1] having the active level. Also, when the $M^{th}$ selection signal SEL[M]

for the second column is shifted to the active level, a pixel PX, where an event occurs, of the pixels PX of the $M^{th}$ column may output the pieces of polarity information POL[1], POL[2], and POL[N] having the active level.

Figure 6:
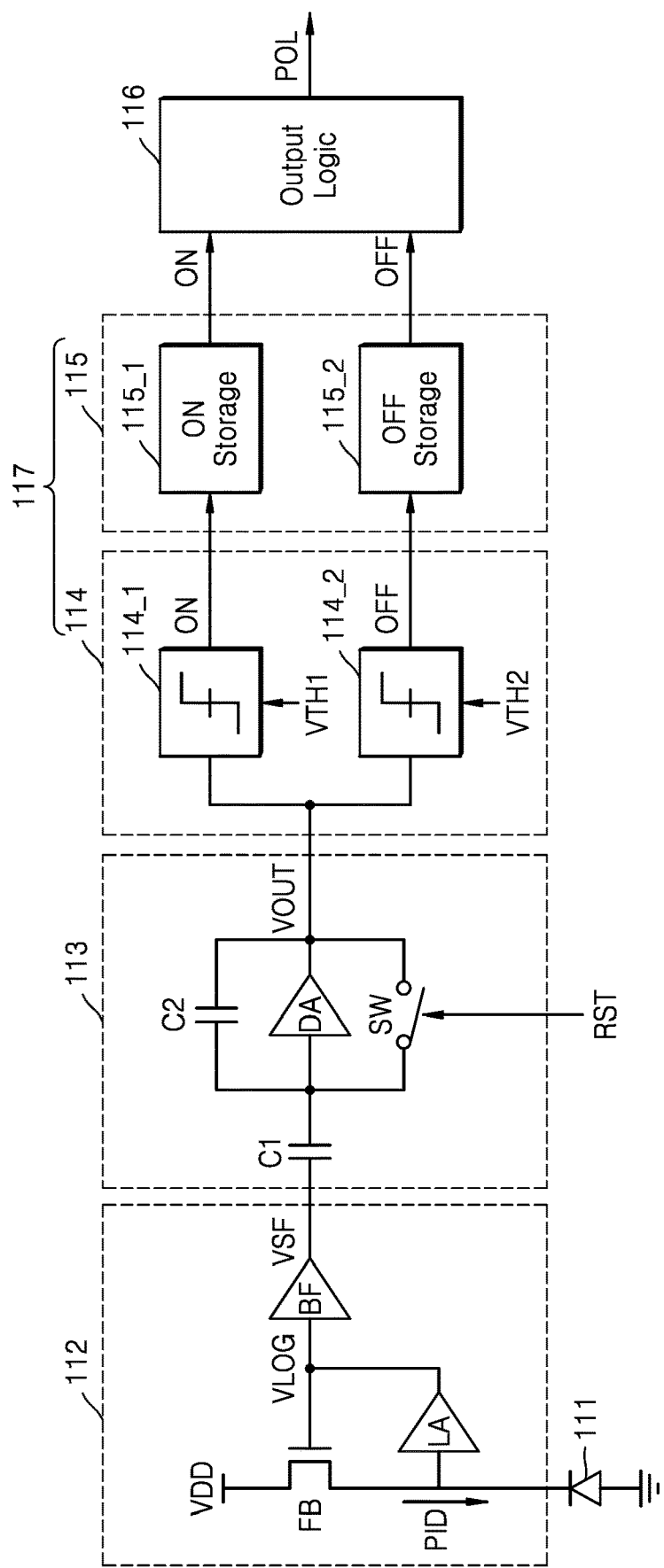
FIG. 6 is a circuit diagram illustrating a pixel according to an embodiment.

FIG. 6 is a circuit diagram illustrating a pixel PX according to an embodiment.

Referring to FIG. 6, the pixel PX may include a photoelectric conversion device 111, a current-to-voltage converter 112, an amplifier 113, a comparator 114, an event storage 115, and an output logic 116. In the pixel PX, an element including the current-to-voltage converter 112, the amplifier 113, the comparator 114, the event storage 115, and the output logic 116 may be referred to as a pixel back-end circuit.

The photoelectric conversion device 111 may convert incident light, for example an optical signal, into an electrical signal, for example, a current PID. The photoelectric conversion device 111 may include, for example, a photodiode, a phototransistor, a photogate, or a pinned photodiode. As the intensity of incident light increases, the photoelectric conversion device 111 may generate the electrical signal having a high level.

The current-to-voltage converter 112 may convert the current PID, generated by the photoelectric conversion device 111, into a voltage and may amplify a level of the voltage to generate a logarithmic-scale logarithmic voltage VLOG. The current-to-voltage converter 112 may include a logarithmic amplifier LA and a feedback transistor FB. In an embodiment, the current-to-voltage converter 112 may further include a buffer BF. The buffer BF may be used to prevent kick-back noise moving from the amplifier 113 to the current-to-voltage converter 112 and to drive a first capacitor C1 or a second capacitor C2 of the amplifier 113 described below. For example, the buffer BF may be implemented as a source-follower buffer. When the buffer BF is included in the current-to-voltage converter 112, the logarithmic voltage VLOG may be input to the buffer BF, and a source-follower voltage VSF may be output.

The amplifier 113 may amplify the logarithmic voltage VLOG, or for example the source-follower voltage VSF, to generate an output voltage VOUT. The amplifier 113 may include the first capacitor C1, the second capacitor C2, a differentiator amplifier DA, and a switch SW. The first capacitor C1 and the second capacitor C2 may be charged with an electric charge corresponding to an output generated by the photoelectric conversion device 111. The differentiator amplifier DA may amplify a voltage variation amount of the logarithmic voltage VLOG, or for example the source-follower voltage VSF, for a certain time, and a feedback circuit may be connected between an input terminal and an output terminal of the differentiator amplifier DA. The switch SW may be disposed in the feedback circuit and may be turned on or off based on a reset signal RST. When the switch SW is turned on and operates, voltages at both ends of the differentiator amplifier DA may be the same, and thus, the output voltage VOUT may be reset. That is, the differentiator amplifier DA may amplify the voltage variation amount of the logarithmic voltage VLOG, or for example the source-follower voltage VSF, from a time at which the output voltage VOUT is reset based on the reset signal RST, thereby generating the output voltage VOUT.

In an embodiment, in the following description, it may be assumed that the amplifier 113 is implemented to have a negative gain, and thus, the output voltage VOUT decreases when the logarithmic voltage VLOG, or for example the source-follower voltage VSF, increases, for example when the intensity of light increases, and the output voltage VOUT increases when the logarithmic voltage VLOG, or for example the source-follower voltage VSF, decreases, for example when the intensity of light decreases. However, embodiments are not limited thereto, and the amplifier 113 may be implemented to have a positive gain.

When the variation amount of light incident on the photoelectric conversion device 111 is greater than or equal to a certain variation level, the comparator 114 may generate an event signal representing the occurrence of an event. In detail, the comparator 114 may compare the output voltage VOUT of the amplifier 113 with a threshold voltage and may generate event signals ON and OFF having the active level on the basis of a result of the comparison.

In an embodiment, the comparator 114 may include a first comparator 114_1, which compares the output voltage VOUT with a first threshold voltage VTH1 and generates an on signal ON representing the occurrence or not of an on event on the basis of a result of the comparison, and a second comparator 114_2, which compares the output voltage VOUT with a second threshold voltage VTH2 and generates an off signal OFF representing the occurrence or not of an off event on the basis of a result of the comparison. The first threshold voltage VTH1 may be the same as or different from the second threshold voltage VTH2.

For example, when the output voltage VOUT is lower than the first threshold voltage VTH1, the first comparator 114_1 may generate the on signal ON representing the occurrence of the on event. Also, when the output voltage VOUT is higher than the second threshold voltage VTH2, the second comparator 1142 may generate the off signal OFF representing the occurrence of the off event.

The event storage 115 may hold and output the on signal ON and the off signal OFF each output from the comparator 114. The event storage 115 may include an on event storage 115_1, which stores the on signal ON output from the first comparator 114_1, and an off event storage 115_2, which stores the off signal OFF output from the second comparator 114_2. In some embodiments, when the pixel PX is scanned, the event storage 115 may output the on signal ON and the off signal OFF.

The output logic 116 may output the event signals ON and OFF. In detail, the output logic 116 may receive the event signals ON and OFF held by the event storage 115 and may generate and output polarity information POL on the basis of the event signals ON and OFF. When the polarity information POL is received, the row event readout circuit 123 may provide the reset signal RST to the pixel PX where an event occurs, on the basis of the polarity information POL.

The pixel PX according to an embodiment may be implemented as a type where the comparator 114 and the event storage 115 described above are merged. In detail, the pixel PX may include a latch-type event storage 117, which compares the output voltage VOUT of the amplifier 113 with threshold voltages and latches and holds the event signals ON and OFF corresponding to a result of the comparison. The latch-type event storage 117 may include a latch-type on event storage, which latches and holds the on signal ON, and a latch-type off event storage, which latches and holds the off signal OFF. Hereinafter, the latch-type event storage 117 will be described in detail with reference to FIGS. 7 to 10B.

Figure 7:
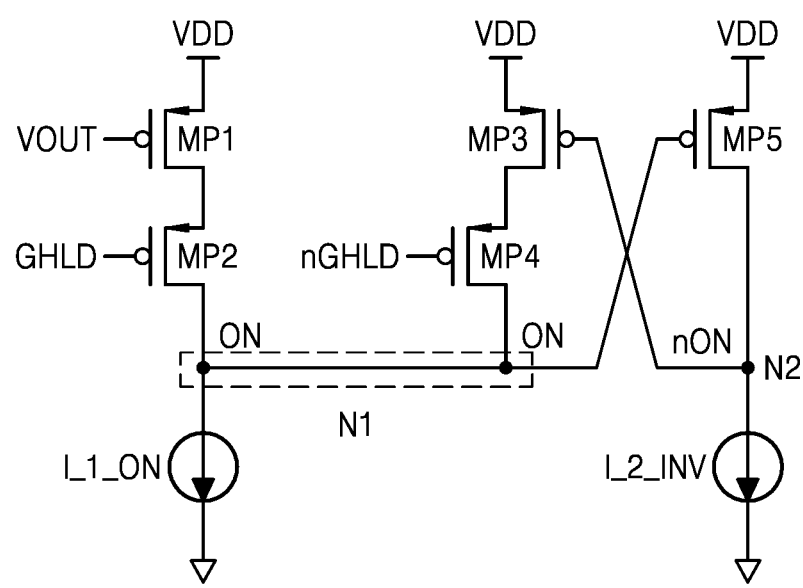
FIG. 7 is a circuit diagram illustrating a latch-type on event storage according to an embodiment.

FIG. 7 is a circuit diagram illustrating a latch-type on event storage according to an embodiment. In detail, FIG. 7 is a circuit diagram illustrating a latch-type on event storage storing an on signal ON in the latch-type event storage 117.

Referring to FIG. 7, the latch-type on event storage may include a plurality of transistors, for example including first transistor MP1, second transistor MP2, third transistor MP3, fourth transistor MP4, and fifth transistor MP5 and a plurality of current sources I_1_ON and I_2_INV. The plurality of transistors, for example first to fifth transistors MP1, MP2, MP3, MP4, and MP5, may each include a p-type metal-oxide-semiconductor (PMOS) transistor. Also, the latch-type on event storage may further include other elements.

The latch-type on event storage may include the first transistor MP1. A first terminal of the first transistor MP1 may receive a source voltage VDD, and a second terminal thereof may be connected to the second transistor MP2. A level of a current flowing from the first transistor MP1 to the second transistor MP2 may vary based on an output voltage VOUT.

The latch-type on event storage may include the second transistor MP2. A first terminal of the second transistor MP2 may be connected to the first transistor MP1, and a second terminal thereof may be connected to a first node N1. The second transistor MP2 may be turned on or off in response to a global hold signal GHLD.

The latch-type on event storage may include a first current source I_1_ON. A first terminal of the first current source I_1_ON may be connected to the first node N1, and a second terminal thereof may be grounded. In an event update operation, the first current source I_1_ON may be an element configuring the first comparator 114_1 of FIG. 6 and may provide a threshold current used to determine a level of an on signal ON described below. In a global hold operation, the first current source I_1_ON may be an element configuring the on event storage 115_1 of FIG. 6 and may operate as a pull-down current source which performs control so that a current flowing in the third to fifth transistors MP3 to MP5 cross-coupled to one another described below does not increase to a certain current level or more.

The latch-type on event storage may include the third transistor MP3. A first terminal of the third transistor MP3 may receive the source voltage VDD, and a second terminal thereof may be connected to the fourth transistor MP4. The third transistor MP3 may be turned on or off in response to a voltage of a second node N2.

The latch-type on event storage may include the fourth transistor MP4. A first terminal of the fourth transistor MP4 may be connected to the third transistor MP3, and a second terminal thereof may be connected to the first node N1. The fourth transistor MP4 may be turned on or off in response to an inverted global hold signal nGHLD having an inverted level of the global hold signal GHLD.

The latch-type on event storage may include the fifth transistor MP5. A first terminal of the fifth transistor MP5 may receive the source voltage VDD, and a second terminal thereof may be connected to the second node N2. The fifth transistor MP5 may be turned on or off in response to a voltage of the first node N1.

A gate of the third transistor MP3 may be connected to a drain of the fifth transistor MP5 and a gate of the fifth transistor MP5 may be connected to a drain of the fourth transistor MP4 serially connected to the third transistor MP3, and thus, the third transistor MP3, the fourth transistor MP4, and the fifth transistor MP5 may have a cross-coupled structure.

The latch-type on event storage may include a second current source I_2_INV. A first terminal of the second current source I_2_INV may be connected to the second node N2, and a second terminal thereof may be grounded. The second current source I_2_INV may operate as an inverter along with the fifth transistor MP5.

In the latch-type on event storage, the voltage of the first node N1 may correspond to an on signal ON representing the occurrence or not of an on event. Also, the voltage of the first node N1 may be determined based on a level of a current, flowing in the first transistor MP1 and the second transistor MP2, and a level of a current of the first current source I_1_ON. In detail, when a level of the current flowing in the first transistor MP1 and the second transistor MP2 is higher than that of the current of the first current source I_1_ON, the voltage of the first node N1 may have a voltage corresponding to a level of the current flowing in the first transistor MP1 and the second transistor MP2. Also, when a level of the current flowing in the first transistor MP1 and the second transistor MP2 is lower than that of the current of the first current source I_1_ON, the voltage of the first node N1 may have a voltage corresponding to a level of the current of the first current source I_1_ON. As described above, the first current source I_1_ON may provide a threshold current used to determine a level of the on signal ON.

Also, in the latch-type on event storage, the voltage of the second node N2 may correspond to an inverted on signal nON having an inverted value with respect to a value of the on signal ON. The first node N1 may be connected to an output logic 116 and may transfer the on signal ON.

The first transistor MP1, the second transistor MP2, and the first current source I_1_ON may correspond to the first comparator 114_1 of FIG. 6. In detail, the first transistor MP1, the second transistor MP2, and the first current source I_1_ON may compare an output voltage VOUT with a first threshold voltage VTH1 on the basis of the global hold signal GHLD and may generate the on signal ON representing the occurrence or not of an on event on the basis of a result of the comparison. The first threshold voltage VTH1 may be adjusted based on a characteristic of at least one of the first transistor MP1 and the first current source I_1_ON.

Also, cross-coupled transistors, for example the third transistor MP3, the fourth transistor MP4, and the fifth transistor MP5, and current sources, for example the first current source I_1_ON and the second current source I_2_INV, may correspond to the on event storage 115_1 of FIG. 6. In detail, the cross-coupled transistors and the current sources may latch the on signal ON according to the inverted global hold signal nGHLD.

Figure 8A:
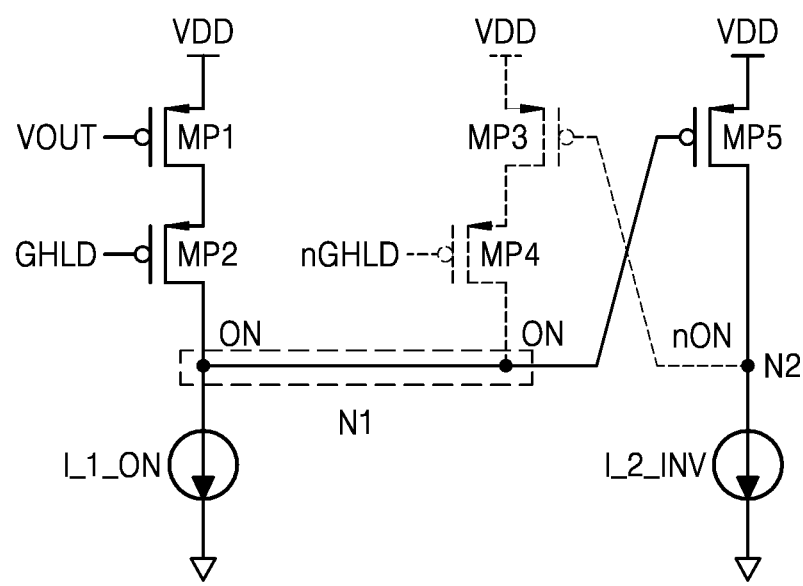
FIGS. 8A and 8B are circuit diagrams for describing an operation of a latch-type on event storage according to an embodiment.
Figure 8B:
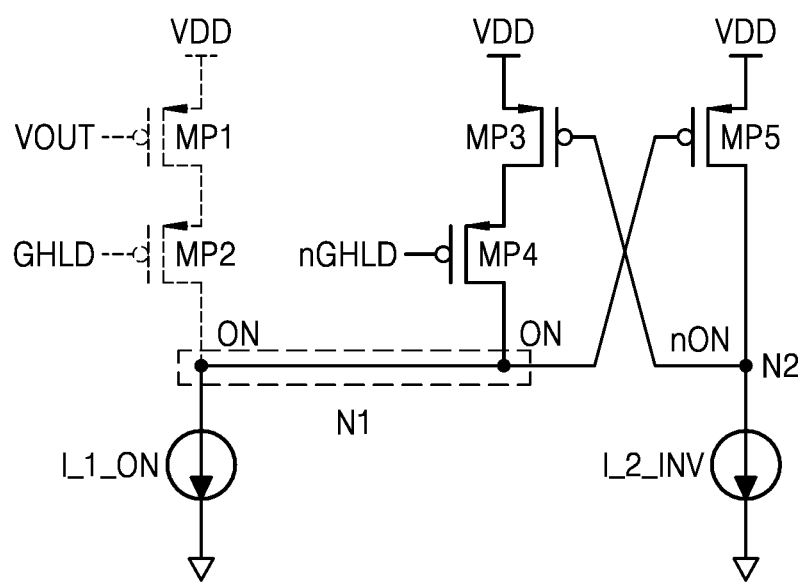

FIGS. 8A and 8B are circuit diagrams for describing an operation of a latch-type on event storage according to an embodiment. In detail, FIG. 8A is a circuit diagram for describing an operation of a latch-type on event storage when an event update operation is performed, and FIG. 8B is a diagram for describing an operation of a latch-type on event storage when a global hold operation is performed.

Referring to FIG. 8A, when an event update operation is being performed, a global hold signal GHLD may have a logic low level, and an inverted global hold signal nGHLD may have a logic high level. Therefore, a second transistor MP2 may be turned on, and a fourth transistor MP4 may be turned off. Also, a current may not flow in a path including the fourth transistor MP4.

When an on event occurs, for example when an output voltage VOUT is lower than a first threshold voltage VTH1, a voltage corresponding to a source voltage VDD may be applied to a first node N1, and thus, an on signal ON may have a logic high level. A fifth transistor MP5 may be turned off, and an inverted on signal nON corresponding to a second node N2 may have a logic low level. When the on event does not occur, a voltage corresponding to the source voltage VDD may not be applied to the first node N1, and thus, the on signal ON may have a logic low level.

Referring to FIG. 8B, when a global hold operation is being performed, the global hold signal GHLD may have a logic high level, and the inverted global hold signal nGHLD may have a logic low level. Therefore, the second transistor MP2 may be turned off, and the fourth transistor MP4 may be turned on. Also, a latch circuit configured with a third transistor MP3, the fourth transistor MP4, and a fifth transistor MP5 cross-coupled to one another may latch the on signal ON.

In related art, an event storage 115 may be implemented so that a structure including a cascaded transistor and capacitor is provided in plurality, for example by providing multiple cascaded transistors and capacitors. In this case, due to a threshold voltage of each of transistors, a high level of the on signal ON may have a value which is lower than a source voltage VDD. According to an embodiment, the latch-type on event storage may share transistors, for example the first transistor MP1 and a first current source I_1_ON, configuring the comparator 114, and thus, may be implemented with fewer transistors, and therefore a high level of the on signal ON may have a value which is substantially the same as the source voltage VDD. Also, when the on signal ON has a logic low level, the on signal ON may have a voltage of 0 V. That is, the on signal ON may have 0 V, or for example a ground voltage, or may have the source voltage VDD.

Figure 9:
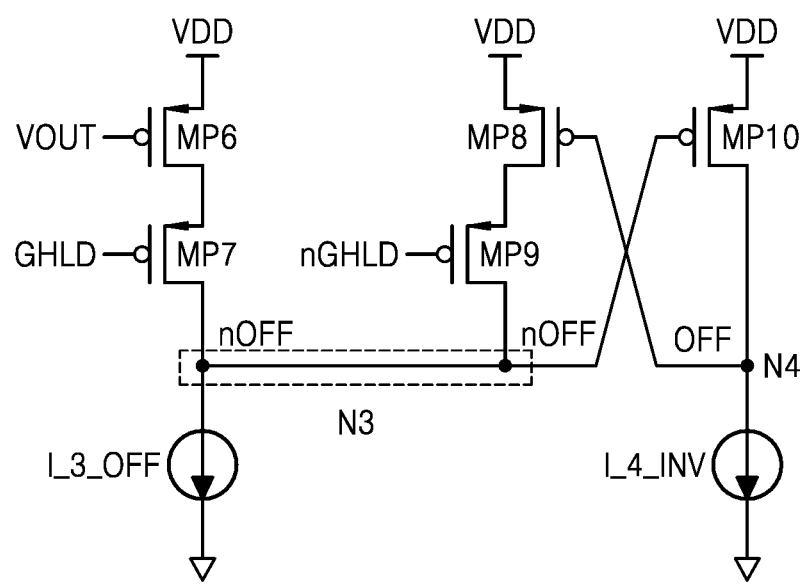
FIG. 9 is a circuit diagram illustrating a second event storage according to an embodiment.

FIG. 9 is a circuit diagram illustrating a second event storage according to an embodiment. In detail, FIG. 9 is a circuit diagram illustrating a latch-type off event storage storing an off signal OFF in the latch-type event storage 117.

Referring to FIG. 9, the latch-type off event storage may include a plurality of transistors, for example including sixth transistor MP6, seventh transistor MP7, eighth transistor MP8, ninth transistor MP9, and tenth transistor MP10 and a plurality of current sources I_3_OFF and I_4_INV. The plurality of transistors, for example sixth to tenth transistors MP6, MP7, MP8, MP9, and MP10, may each include a PMOS transistor. Also, the latch-type off event storage may further include other elements.

The latch-type off event storage may include the sixth transistor MP6. A first terminal of the sixth transistor MP6 may receive a source voltage VDD, and a second terminal thereof may be connected to the seventh transistor MP7. A level of a current flowing from the sixth transistor MP6 to the seventh transistor MP7 may vary based on an output voltage VOUT.

The latch-type off event storage may include the seventh transistor MP7. A first terminal of the seventh transistor MP7 may be connected to the sixth transistor MP6, and a second terminal thereof may be connected to a third node N3. The seventh transistor MP7 may be turned on or off in response to a global hold signal GHLD.

The latch-type off event storage may include a third current source I_3_OFF. A first terminal of the third current source I_3_OFF may be connected to the third node N3, and a second terminal thereof may be grounded. In an event update operation, the third current source I_3_OFF may be an element configuring the second comparator 114_2 of FIG. 6 and may provide a threshold current used to determine a level of an inverted off signal nOFF described below. In a global hold operation, the third current source I_3_OFF may be an element configuring the off event storage 115_2 of FIG. 6 and may operate as a pull-down current source which performs control so that a current flowing in the eighth to tenth transistors MP8 to MP10 cross-coupled to one another described below does not increase to a certain current level or more.

The latch-type off event storage may include the eighth transistor MP8. A first terminal of the eighth transistor MP8 may receive the source voltage VDD, and a second terminal thereof may be connected to the ninth transistor MP9. The eighth transistor MP8 may be turned on or off in response to a voltage of a fourth node N4.

The latch-type off event storage may include the ninth transistor MIP9. A first terminal of the ninth transistor MP9 may be connected to the eighth transistor MP8, and a second terminal thereof may be connected to the third node N3. The ninth transistor MP9 may be turned on or off in response to an inverted global hold signal nGHLD having an inverted level of the global hold signal GHLD.

The latch-type off event storage may include the tenth transistor MP10. A first terminal of the tenth transistor MP10 may receive the source voltage VDD, and a second terminal thereof may be connected to the fourth node N4. The tenth transistor MP10 may be turned on or off in response to a voltage of the third node N3.

A gate of the eighth transistor MP8 may be connected to a drain of the tenth transistor MP10 and a gate of the tenth transistor MP10 may be connected to a drain of the ninth transistor MP9 serially connected to the eighth transistor MP8, and thus, the eighth transistor MP8, the ninth transistor MP9, and the tenth transistor MP10 may have a cross-coupled structure.

The latch-type off event storage may include a fourth current source I_4_INV. A first terminal of the fourth current source I_4_INV may be connected to the fourth node N4, and a second terminal thereof may be grounded. The fourth current source I_4_INV may operate as an inverter along with the tenth transistor MP10.

In the latch-type off event storage, the voltage of the fourth node N4 may correspond to an off signal OFF representing the occurrence or not of an off event. Also, in the latch-type off event storage, the voltage of the third node N3 may correspond to an inverted off signal nOFF having an inverted value with respect to the off signal OFF. Also, the voltage of the third node N3 may be determined based on a level of a current, flowing in the sixth transistor MP6 and the seventh transistor MP7, and a level of a current of the third current source I_3_OFF. In detail, when a level of the current flowing in the sixth transistor MP6 and the seventh transistor MP7 is higher than that of the current of the third current source I_3_OFF, the voltage of the third node N3 may have a voltage corresponding to a level of the current flowing in the sixth transistor MP6 and the seventh transistor MP7. Also, when a level of the current flowing in the sixth transistor MP6 and the seventh transistor MP7 is lower than that of the current of the third current source I_3_OFF, the voltage of the third node N3 may have a voltage corresponding to a level of the current of the third current source I_3_OFF. As described above, the third current source I_3_OFF may provide a threshold current used to determine a level of the inverted off signal nOFF. Also, the fourth node N4 may be connected to an output logic 116 and may transfer the off signal OFF.

The sixth transistor MP6, the seventh transistor MP7, and the third current source I_3_OFF may correspond to the second comparator 114_2 of FIG. 6. In detail, the sixth transistor MP6, the seventh transistor MP7, and the third current source I_3_OFF may compare an output voltage VOUT with a second threshold voltage VTH2 on the basis of the global hold signal GHLD and may generate the off signal OFF representing the occurrence or not of an off event on the basis of a result of the comparison. The second threshold voltage VTH2 may be adjusted based on a characteristic of at least one of the sixth transistor MP6 and the third current source I_3_OFF.

Also, cross-coupled transistors, for example the ninth transistor MP9 and the tenth transistor MP10, and current sources, for example the third current source I_3_OFF and the fourth current source I_4_INV, may correspond to the off event storage 1152 of FIG. 6. In detail, the cross-coupled transistors and the current sources may latch the off signal OFF according to the inverted global hold signal nGHLD.

Figure 10A:
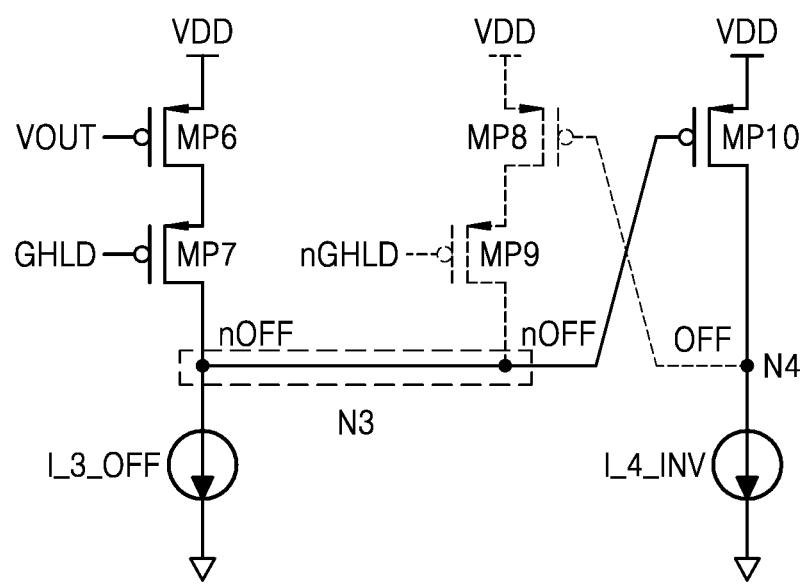
FIGS. 10A and 10B are circuit diagrams for describing an operation of a latch-type off event storage according to an embodiment.
Figure 10B:
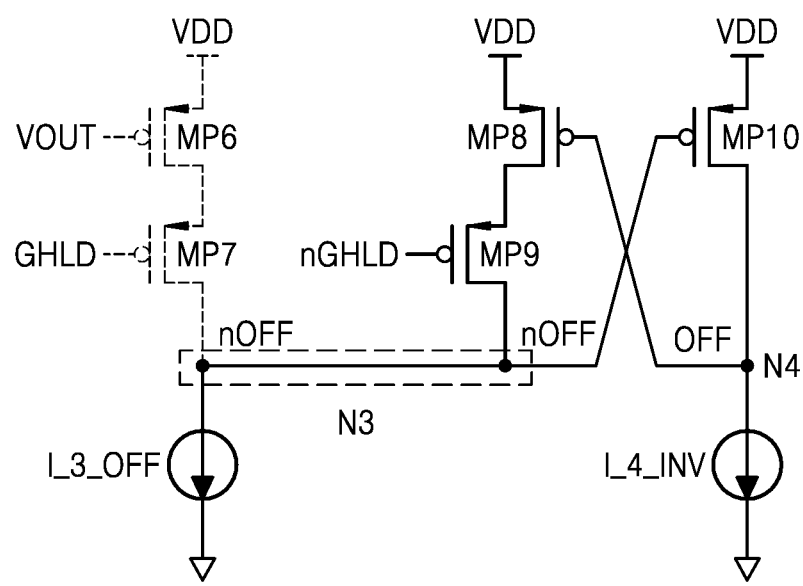

FIGS. 10A and 10B are circuit diagrams for describing an operation of a latch-type off event storage according to an embodiment. In detail, FIG. 10A is a circuit diagram for describing an operation of a latch-type off event storage when an event update operation is performed, and FIG. 10B is a diagram for describing an operation of a latch-type off event storage when a global hold operation is performed.

Referring to FIG. 10A, when an event update operation is being performed, a global hold signal GHLD may have a logic low level, and an inverted global hold signal nGHLD may have a logic high level. Therefore, a seventh transistor MP7 may be turned on, and a ninth transistor MP9 may be turned off. Also, a current may not flow in a path including the ninth transistor MP9.

When an off event occurs, for example when an output voltage VOUT is higher than a second threshold voltage VTH2, a voltage corresponding to a threshold current of a third current source I_3_OFF may be applied to a third node N3, and thus, an inverted off signal nOFF may have a logic low level. Also, the tenth transistor MP10 may be turned on based on the inverted off signal nOFF, and a voltage corresponding to the source voltage VDD may be applied to the fourth node N4, whereby an off signal OFF may have a logic high level. When the off event does not occur, a voltage corresponding to the source voltage VDD may be applied to the third node N3, and thus, the inverted off signal nOFF may have a logic high level. Also, the tenth transistor MP10 may be turned off based on the inverted off signal nOFF, and a voltage corresponding to the source voltage VDD may not be applied to the fourth node N4, whereby the off signal OFF may have a logic low level.

Referring to FIG. 10B, when a global hold operation is being performed, the global hold signal GHLD may have a logic high level, and the inverted global hold signal nGHLD may have a logic low level. Therefore, the seventh transistor MP7 may be turned off, and the ninth transistor MP9 may be turned on. Also, a latch circuit configured with an eighth transistor MP8, the ninth transistor MP9, and the tenth transistor MP10 cross-coupled to one another may latch the off signal OFF.

According to an embodiment, the latch-type off event storage may share transistors, for example, a sixth transistor MP6, the tenth transistor MP10, the third current source I_3_OFF, and a fourth current source I_4_INV, configuring the second comparator 114_2, and thus, may be implemented with fewer transistors and a high level of the off signal OFF may have a value which is substantially the same as the source voltage VDD. Also, when the off signal OFF has a logic low level, the off signal OFF may have a voltage of 0 V. That is, the off signal OFF may have 0 V, or for example a ground voltage, or may have the source voltage VDD.

As described above, the vision sensor 100 according to an embodiment may hold an event signal by using a latch circuit including cross-coupled transistors. In a case where the latch circuit holds the event signal, the leakage of a latched event signal may not occur even over time, and thus, the vision sensor 100 may have an infinite or indefinite holding time. Also, the latch circuit may share a transistor of the comparator 114, and thus, may be implemented with only fewer transistors, thereby decreasing a product size and the manufacturing cost. Also, a pull-down current source for performing a current limiting operation may be connected to the latch circuit, and thus, an adverse effect caused by an excessive dynamic current may be prevented.

Figure 11:
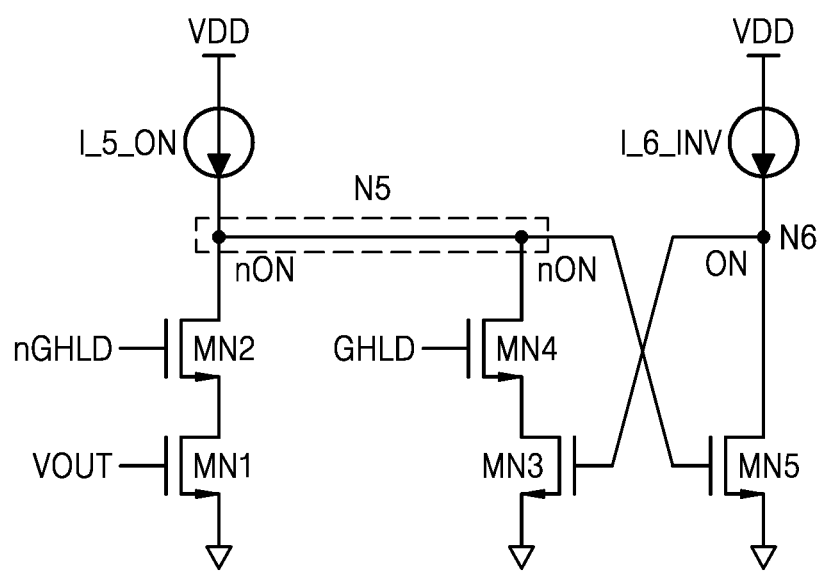
FIG. 11 is a circuit diagram illustrating a latch-type on event storage according to an embodiment.

FIG. 11 is a circuit diagram illustrating a latch-type on event storage according to an embodiment. In detail, FIG. 11 is a circuit diagram illustrating a modifiable embodiment of FIG. 7.

Referring to FIG. 11, the latch-type on event storage may include a plurality of transistors, for example including eleventh transistor MN1, twelfth transistor MN2, thirteenth transistor MN3, fourteenth transistor MN4, and fifteenth transistor MN5 and a plurality of current sources I_5_ON and I_6_INV. The plurality of transistors, for example eleventh to fifteenth transistors MN1, MN2, MN3, MN4, and MN5, may each include an n-type metal-oxide-semiconductor (NMOS) transistor.

The latch-type on event storage may include the eleventh transistor MN1. A first terminal of the eleventh transistor MN1 may be grounded, and a second terminal thereof may be connected to the twelfth transistor MN2. A level of a current flowing from the eleventh transistor MN1 to the twelfth transistor MN2 may vary based on an output voltage VOUT.

The latch-type on event storage may include the twelfth transistor MN2. A first terminal of the twelfth transistor MN2 may be connected to the eleventh transistor MN1, and a second terminal thereof may be connected to a fifth node N5. The twelfth transistor MN2 may be turned on or off in response to an inverted global hold signal nGHLD.

The latch-type on event storage may include a fifth current source I_5_ON. A first terminal of the fifth current source I_5_ON may be connected to the fifth node N5, and a second terminal thereof may receive a source voltage VDD. In an event update operation, the fifth current source I_5_ON may be an element configuring the first comparator 114_1 of FIG. 6 and may provide a threshold current used to determine a level of an inverted on signal nON described below. Also, in a global hold operation, the fifth current source I_5_ON may be an element configuring the on event storage 115_1 of FIG. 6 and may operate as a pull-up current source which performs control so that a current flowing in the thirteenth to fifteenth transistors MN3 to MN5 cross-coupled to one another described below does not decrease to a certain current level or less.

The latch-type on event storage may include the thirteenth transistor MN3. A first terminal of the thirteenth transistor MN3 may be grounded, and a second terminal thereof may be connected to the fourteenth transistor MN4. The thirteenth transistor MN3 may be turned on or off in response to a voltage of a sixth node N6.

The latch-type on event storage may include the fourteenth transistor MN4. A first terminal of the fourteenth transistor MN4 may be connected to the thirteenth transistor MN3, and a second terminal thereof may be connected to the fifth node N5. The fourteenth transistor MN4 may be turned on or off in response to the global hold signal GHLD.

The latch-type on event storage may include the fifteenth transistor MN5. A first terminal of the fifteenth transistor MN5 may be grounded, and a second terminal thereof may be connected to the sixth node N6. The fifteenth transistor MN5 may be turned on or off in response to a voltage of the fifth node N5.

A gate of the thirteenth transistor MN3 may be connected to a drain of the fifteenth transistor MN5 and a gate of the fifteenth transistor MN5 may be connected to a drain of the fourteenth transistor MN4 serially connected to the thirteenth transistor MN3, and thus, the thirteenth transistor MN3, the fourteenth transistor MN4, and the fifteenth transistor MN5 may have a cross-coupled structure. The thirteenth transistor MN3, the fourteenth transistor MN4, and the fifteenth transistor MN5 cross-coupled to one another may perform a latch operation on the basis of the global hold signal GHLD.

The latch-type on event storage may include a sixth current source I_6_INV. A first terminal of the sixth current source I_6_INV may be connected to the second node N2, and a second terminal thereof may be grounded. The sixth current source I_6_INV may operate as an inverter along with the fifteenth transistor MN5.

In the latch-type on event storage, the voltage of the sixth node N6 may correspond to an on signal ON representing the occurrence or not of an on event. Also, in the latch-type on event storage, the voltage of the fifth node N5 may correspond to the inverted on signal nON having an inverted value with respect to the on signal ON. Also, the voltage of the fifth node N5 may be determined based on a level of a current, flowing in the eleventh transistor MN1 and the twelfth transistor MN2, and a level of a current of the fifth current source I_5_ON. In detail, when a level of the current flowing in the eleventh transistor MN1 and the twelfth transistor MN2 is higher than that of the current of the fifth current source I_5_ON, the voltage of the fifth node N5 may have a voltage corresponding to a level of the current flowing in the eleventh transistor MN1 and the twelfth transistor MN2. Also, when a level of the current flowing in the eleventh transistor MN1 and the twelfth transistor MN2 is lower than that of the current of the fifth current source I_5_ON, the voltage of the fifth node N5 may have a voltage corresponding to a level of the current of the fifth current source I_5_ON. As described above, the fifth current source I_5_ON may provide a threshold current used to determine a level of the inverted on signal nON. The sixth node N6 may be connected to an output logic 116 and may transfer the on signal ON.

Figure 12:
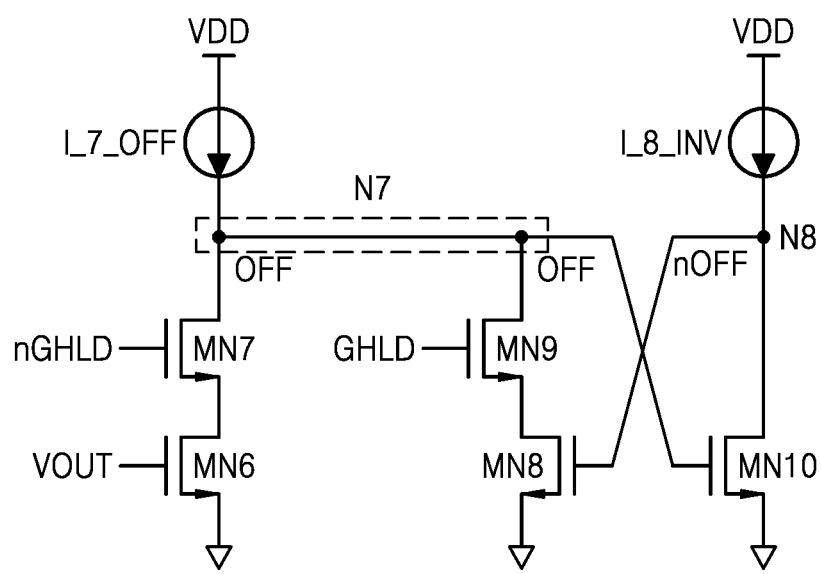
FIG. 12 is a circuit diagram illustrating a latch-type off event storage according to an embodiment.

FIG. 12 is a circuit diagram illustrating a latch-type off event storage according to an embodiment. In detail, FIG. 12 is a circuit diagram illustrating a modifiable embodiment of FIG. 9.

Referring to FIG. 12, the latch-type off event storage may include a plurality of transistors, for example including sixteenth transistor MN6, seventeenth transistor MN7, eighteenth transistor MN8, nineteenth transistor MN9, and twentieth transistor MN10 and a plurality of current sources I_7_OFF and I_8_INV. The plurality of transistors, for example, sixteenth to twentieth transistors MN6, MN7, MN8, MN9, and MN10, may each include an NMOS transistor.

The latch-type off event storage may include the sixteenth transistor MN6. A first terminal of the sixteenth transistor MN6 may be grounded, and a second terminal thereof may be connected to the seventeenth transistor MN7. A level of a current flowing from the sixteenth transistor MN6 to the seventeenth transistor MN7 may vary based on an output voltage VOUT.

The latch-type off event storage may include the seventeenth transistor MN7. A first terminal of the seventeenth transistor MN7 may be connected to the sixteenth transistor MN6, and a second terminal thereof may be connected to a seventh node N7. The twelfth transistor MN2 may be turned on or off in response to an inverted global hold signal nGHLD.

The latch-type off event storage may include a seventh current source I_7_OFF. A first terminal of the seventh current source I_7_OFF may be connected to the seventh node N7, and a second terminal thereof may receive a source voltage VDD. In an event update operation, the seventh current source I_7_OFF may be an element configuring the first comparator 114_2 of FIG. 6 and may provide a threshold current used to determine a level of an off signal OFF described below. Also, in a global hold operation, the seventh current source I_7_OFF may be an element configuring the off event storage 115_2 of FIG. 6 and may operate as a pull-up current source which performs control so that a current flowing in the eighteenth to twentieth transistors MN8 to MN10 cross-coupled to one another described below does not decrease to a certain current level or less.

The latch-type off event storage may include the eighteenth transistor MN8. A first terminal of the eighteenth transistor MN8 may be grounded, and a second terminal thereof may be connected to the nineteenth transistor MN9. The eighteenth transistor MN8 may be turned on or off in response to a voltage of an eighth node N8.

The latch-type off event storage may include the nineteenth transistor MN9. A first terminal of the nineteenth transistor MN9 may be connected to the eighteenth transistor MN8, and a second terminal thereof may be connected to the seventh node N7. The nineteenth transistor MN9 may be turned on or off in response to the global hold signal GHLD.

The latch-type off event storage may include the twentieth transistor MN10. A first terminal of the twentieth transistor MN10 may be grounded, and a second terminal thereof may be connected to the eighth node N8. The twentieth transistor MN10 may be turned on or off in response to a voltage of the seventh node N7.

A gate of the eighteenth transistor MN8 may be connected to a drain of the twentieth transistor MN10 and a gate of the twentieth transistor MN10 may be connected to a drain of the nineteenth transistor MN9 serially connected to the eighteenth transistor MN8, and thus, the eighteenth transistor MN8, the nineteenth transistor MN9, and the twentieth transistor MN10 may have a cross-coupled structure. The eighteenth transistor MN8, the nineteenth transistor MN9, and the twentieth transistor MN10 cross-coupled to one another may perform a latch operation on the basis of the global hold signal GHLD.

The latch-type off event storage may include an eighth current source I_8_INV. A first terminal of the eighth current source I_8_INV may be connected to the eighth node N8, and a second terminal thereof may be connected to a source voltage VDD. The eighth current source I_8_INV may operate as an inverter along with the twentieth transistor MN10.

In the latch-type off event storage, the voltage of the seventh node N7 may correspond to an off signal OFF representing the occurrence or not of an off event. Also, the voltage of the seventh node N7 may be determined based on a level of a current, flowing in the sixteenth transistor MN6 and the seventeenth transistor MN7, and a level of a current of the seventh current source I_7_OFF. In detail, when a level of the current flowing in the sixteenth transistor MN6 and the seventeenth transistor MN7 is higher than that of the current of the seventh current source I_7_OFF, the voltage of the seventh node N7 may have a voltage corresponding to a level of the current flowing in the sixteenth transistor MN6 and the seventeenth transistor MN7. Also, when a level of the current flowing in the sixteenth transistor MN6 and the seventeenth transistor MN7 is lower than that of the current of the seventh current source I_7_OFF, the voltage of the seventh node N7 may have a voltage corresponding to a level of the current of the seventh current source I_7_OFF. As described above, the seventh current source I_7_OFF may provide a threshold current used to determine a level of the off signal OFF. Also, in the latch-type off event storage, the voltage of the eighth node N8 may correspond to an inverted on signal nOFF having an inverted value with respect to the off signal OFF. The seventh node N7 may be connected to an output logic 116 and may transfer the off signal OFF.

The latch-type event storage 117 described above with reference to FIGS. 11 and 12 may be implemented with an NMOS transistor, and thus, an amplifier 113 providing an output voltage VOUT to the latch-type event storage 117 may be modified to correspond thereto. For example, the amplifier 113 may be implemented to have a positive gain. Therefore, when a logarithmic voltage VLOG increases, for example when the intensity of light increases, the output voltage VOUT may increase, and when the logarithmic voltage VLOG decreases, for example when the intensity of light decreases, the output voltage VOUT may decrease. An operation of the latch-type event storage 117 implemented with the NMOS transistor described above with reference to FIGS. 11 and 12 may be substantially the same as that of the latch-type event storage 117 implemented with the PMOS transistor described above with reference to FIGS. 8A, 8B, 10A, and 10B, and thus, repeated description thereof is omitted.

Figure 13:
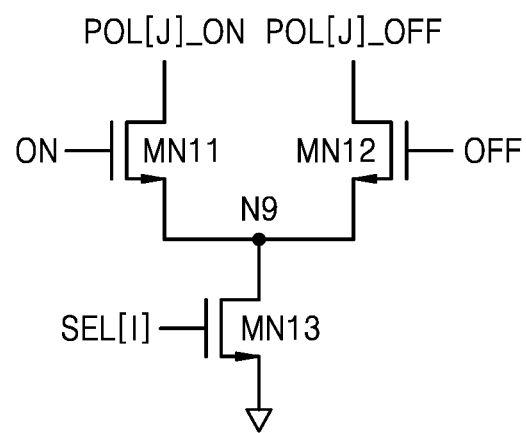
FIG. 13 is a circuit diagram illustrating an output logic according to an embodiment.

FIG. 13 is a circuit diagram illustrating an output logic according to an embodiment. In detail, FIG. 13 is a circuit diagram illustrating an output logic 116 of a $J^{th}$ pixel PX of an $I^{th}$ column of a pixel array 110.

Referring to FIG. 13, the output logic 116 may include a plurality of transistors, for example including twenty-first transistor MN11, twenty-second transistor MN12, and twenty-third transistor MN13. The plurality of transistors, for example, twenty-first to twenty-third transistors MN11, MN12, and MN13, may each include an NMOS transistor. The output logic 116 may further include other elements.

The output logic 116 may include the twenty-first transistor MN11. A first terminal of the twenty-first transistor MN11 may output first polarity information POL[J]_ON representing the occurrence or not of an on event among pieces of polarity information, and a second terminal thereof may be connected to a ninth node N9. The twenty-first transistor MN11 may be turned on or off in response to an on signal ON.

The output logic 116 may include the twenty-second transistor MN12. A first terminal of the twenty-second transistor MN12 may output second polarity information POL[J]_OFF representing the occurrence or not of an off event among the pieces of polarity information, and a second terminal thereof may be connected to the ninth node N9. The twenty-second transistor MN12 may be turned on or off in response to an off signal OFF.

The output logic 116 may include the twenty-third transistor MN13. A first terminal of the twenty-third transistor MN13 may be connected to the ninth node N9, and a second terminal thereof may be grounded. The twenty-third transistor MN13 may be turned on or off in response to a selection signal SEL[K] corresponding to a $K^{th}$ column where a corresponding pixel PX is provided. As the selection signal SEL[K] is shifted to the active level, the output logic 116 may output the polarity information POL[J]_ON and the polarity information POL[J]_OFF.

As described above with reference to FIGS. 8B and 10B, the on signal ON and the off signal OFF each output from the latch-type event storage 117 according to an embodiment may each have 0 V (a ground voltage) or a source voltage VDD. That is, the twenty-first transistor MN11 and the twenty-second transistor MN12 each operating based on the on signal ON and the off signal OFF may have a gate-source voltage VGS having a sufficient level. In this case, a current flowing in a transistor may be proportional to a width-to-length ratio (W/L) and a gate-source voltage VGS of the transistor, and thus, when a high gate-source voltage VGS is supplied, a transistor having a small channel width may be used. Therefore, the output logic 116 may be implemented with the twenty-first transistor MN11 and the twenty-second transistor MN12, which are small in size, and thus, the output logic 116 may be miniaturized.

Figure 14A:
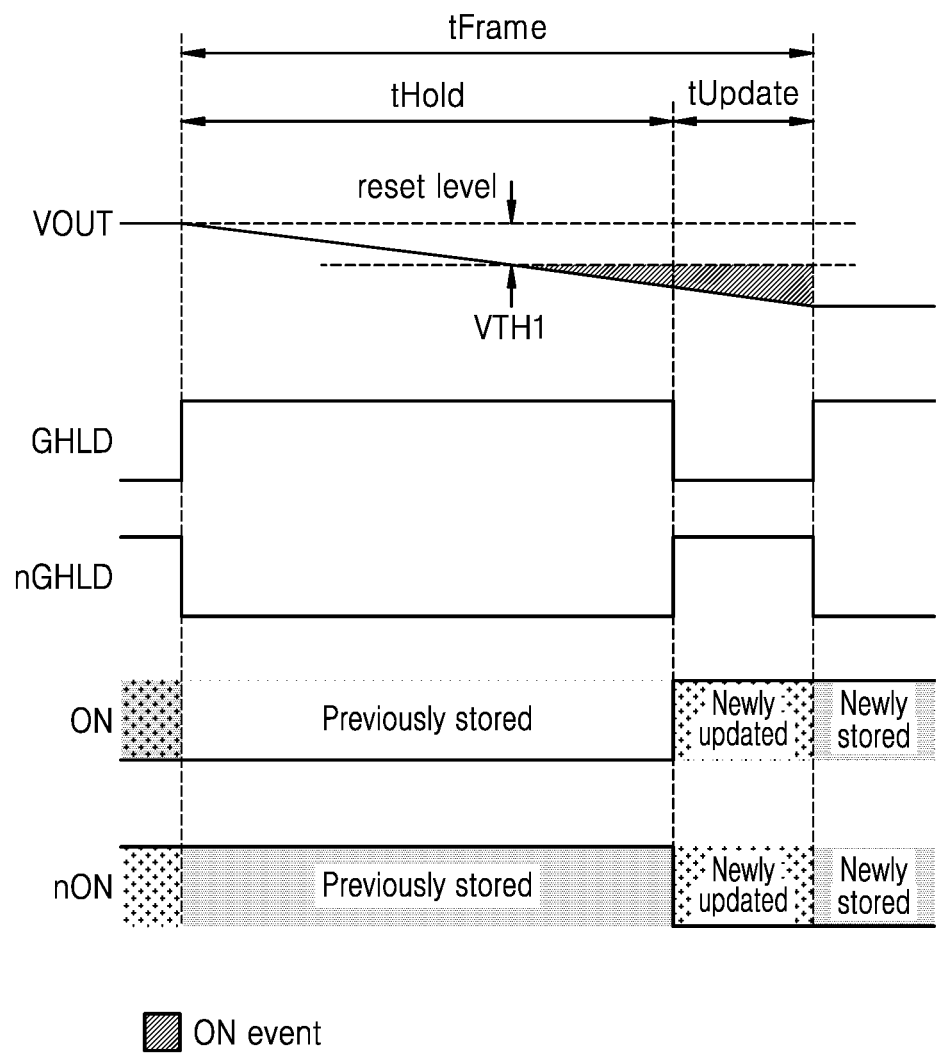
FIGS. 14A and 14B are timing diagrams showing a case where an event according to an embodiment occurs according to an embodiment.
Figure 14B:
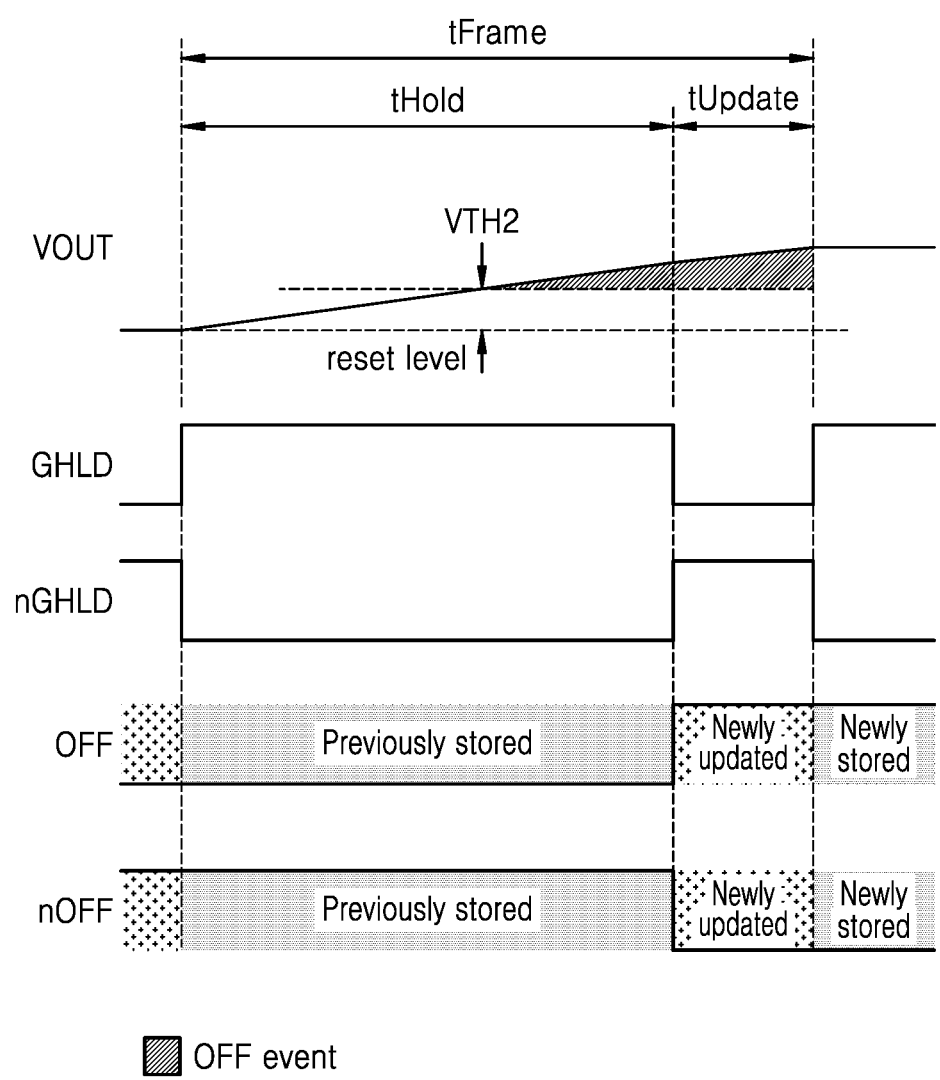

FIGS. 14A and 14B are timing diagrams showing a case where an event according to an embodiment occurs. In detail, FIG. 14A is a diagram showing a case where an on event according to an embodiment occurs, and FIG. 14B is a diagram showing a case where an off event according to an embodiment occurs. Hereinafter, an embodiment where a latch-type event storage 117 is implemented with the PMOS transistors described above with reference to FIGS. 7 and 9 will be described as an example.

Referring to FIGS. 14A and 14B, a global hold signal GHLD has the active level in a global hold period tHold, and thus, a vision sensor 100 may perform a global hold operation. The vision sensor 100 may prevent the recording of a new event signal in the global hold operation and may hold a previous event signal. Therefore, the on signal ON may maintain a previous event signal in the global hold period tHold.

Referring to FIG. 14A, in the global hold period tHold, as the amount of light incident on a photoelectric conversion device 111 increases, the output voltage VOUT may progressively decrease. For example, the output voltage VOUT reset by a reset signal RST provided from a row event readout circuit 123 may progressively decrease in a reset level. When the output voltage VOUT is lower than a first threshold voltage VTH1, an on event may occur.

The global hold signal GHLD may have the inactive level in an update period tUpdate, and thus, the vision sensor 100 may perform an event update operation of recording a new event signal. Therefore, the on signal ON may be updated to the new event signal in the update period tUpdate. For example, referring to FIG. 14A, when an on event occurs in the global hold period tHold, the on signal ON may be shifted to a logic high level. When the on event occurs in the global hold period tHold, the inverted on signal nON may be shifted to a logic low level.

Referring to FIG. 14B, in the global hold period tHold, as the amount of light incident on the photoelectric conversion device 111 decreases, the output voltage VOUT may progressively increase. For example, the output voltage VOUT reset by the reset signal RST provided from the row event readout circuit 123 may progressively increase in the reset level. When the output voltage VOUT is higher than a second threshold voltage VTH2, an off event may occur.

The global hold signal GHLD may have the inactive level in the update period tUpdate, and thus, the vision sensor 100 may perform the event update operation. Therefore, the off signal OFF may be updated to the new event signal in the update period tUpdate. For example, referring to FIG. 14B, when an off event occurs in the global hold period tHold, the off signal OFF may be shifted to a logic high level. When the off event occurs in the global hold period tHold, the inverted off signal nOFF may be shifted to a logic low level.

Figure 15:
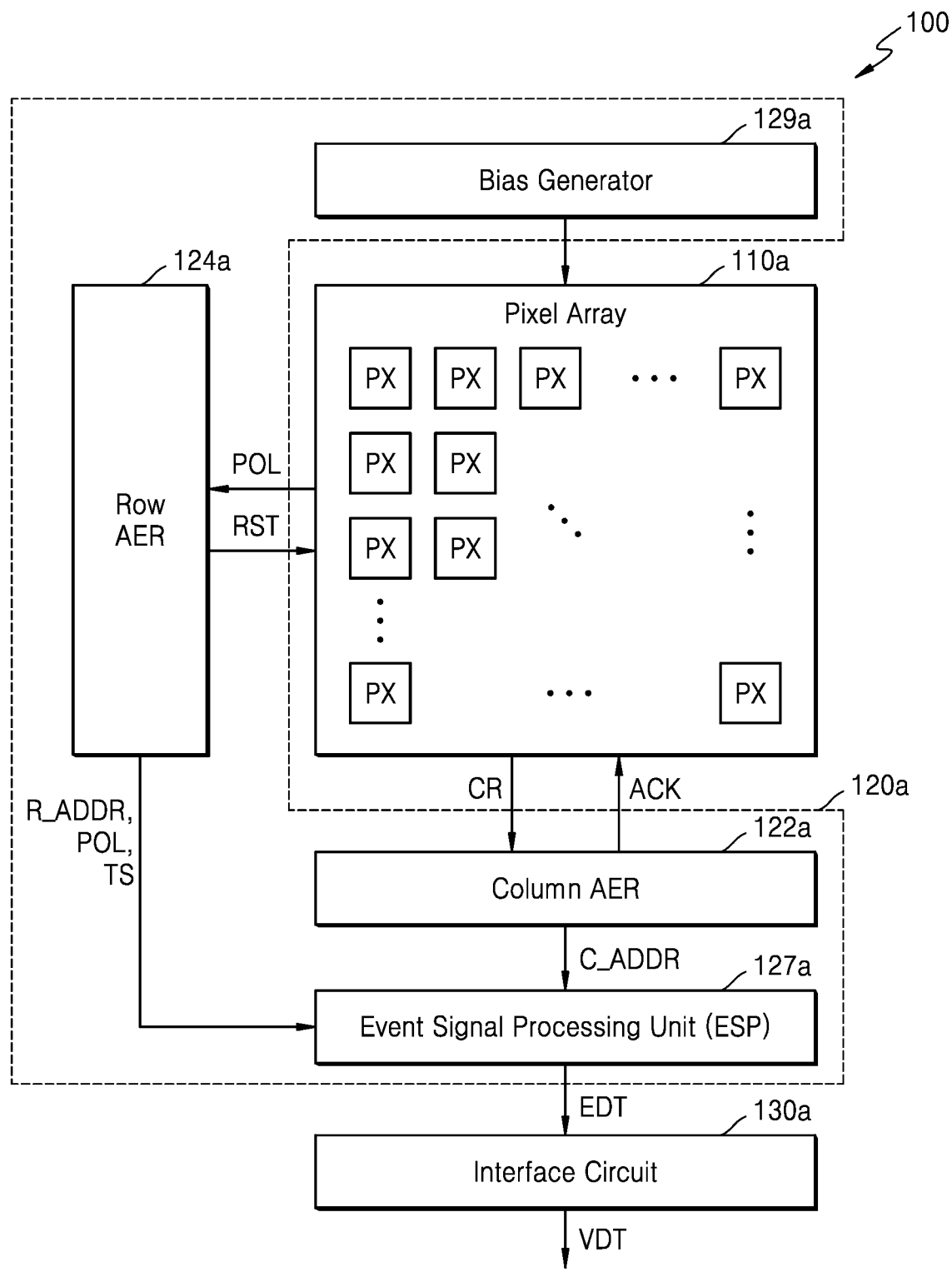
FIG. 15 is a block diagram illustrating in detail the vision sensor of FIG. 2 according to an embodiment.

FIG. 15 is a block diagram illustrating in detail the vision sensor 100 of FIG. 2. A vision sensor 100a of FIG. 15 may be a modifiable embodiment of the vision sensor 100 of FIG. 3.

Referring to FIG. 15, the vision sensor 100a may include a pixel array 110a, an event detection circuit 120a, and an interface circuit 130a, and the event detection circuit 120a may include a column AER 122a, a row AER 124a, a bias generator 129a, and an ESP 127a. The vision sensor 100a may further include a plurality of elements such as an event speed controller which controls an event detection speed.

The pixel array 110a and the interface circuit 130a may correspond to the pixel array 110 and the interface circuit 130 described above with reference to FIG. 2, and thus, repeated descriptions thereof are omitted. Also, the bias generator 129a may correspond to the bias generator 129 of FIG. 3, and thus, repeated descriptions thereof are omitted.

According to an embodiment, a pixel PX sensing an event, for example, an on event or an off event, among a plurality of pixels PX configuring a pixel array 110a may transfer a column request CR, which is a signal representing the occurrence of an event, to the column AER 112a.

The column AER 122a may receive the column request CR from the pixel PX, where the event occurs. The column AER 122a may transfer a response signal ACK to the pixel PX where the event occurs, in response to the column request CR received thereby. Also, the column AER 122a may generate a column address C_ADDR of the pixel PX where the event occurs, on the basis of the column request CR received thereby.

The pixel PX, where the event occurs, may transfer polarity information POL to the row AER 124a in response to the response signal ACK. An implementation example of the polarity information POL may be substantially the same as description given above with reference to FIG. 3, and thus, repeated descriptions thereof are omitted.

According to an embodiment, each of a plurality of pixels PX configuring the pixel array 110a may correspond to the pixel PX described above with reference to FIGS. 6 to 13 and may operate based on the method described above with reference to FIGS. 5, 14A, and 14B. That is, each of the plurality of pixels PX configuring the pixel array 110a may be implemented to generate the polarity information POL by using a latch-type event storage 117.

The row AER 124a may receive the polarity information POL from the pixel PX where the event occurs. The row AER 124a may transfer the reset signal RST to the pixel PX where the event occurs, in response to the polarity information POL. The pixel PX, where the event occurs, may be reset in response to the reset signal RST. Also, the row AER 124a may generate a row address R_ADDR of the pixel PX, where the event occurs, on the basis of the polarity information POL received thereby. Also, the row AER 124a may generate a time stamp TS including information about a time at which the event occurs, on the basis of the polarity information POL. In some embodiments, the time stamp TS may be generated by a time stamper included in the row AER 124a. For example, the time stamper may be implemented by using a timetick generated by units of several to tens of is.

In association with FIG. 15, an operation of the row AER 124a and the column AER 122a has been described on the assumption that information, for example, the column request CR and the polarity information POL, associated with the occurrence of an event is read from the pixel array 110a by column units. However, an operation of the row AER 124a and the column AER 122a is not limited thereto, and the row AER 124a and the column AER 122a may read information associated with the occurrence of an event from the pixel PX where the event occurs, on the basis of various methods. For example, information associated with the occurrence of an event may be read from the pixel array 110a by row units, and an operation of the row AER 124a and the column AER 122a may be replaced. That is, the column AER 122a may receive the polarity information POL and may transfer the reset signal RST to the pixel array 110a. Also, the row AER 124a and the column AER 122a may individually access the pixel PX where the event occurs.

The ESP 127a may generate event data EDT on the basis of the column address C_ADDR, the row address R_ADDR, the polarity information POL, and the time stamp TS, which are received from the row AER 124a and the column AER 122a.

Figure 16:
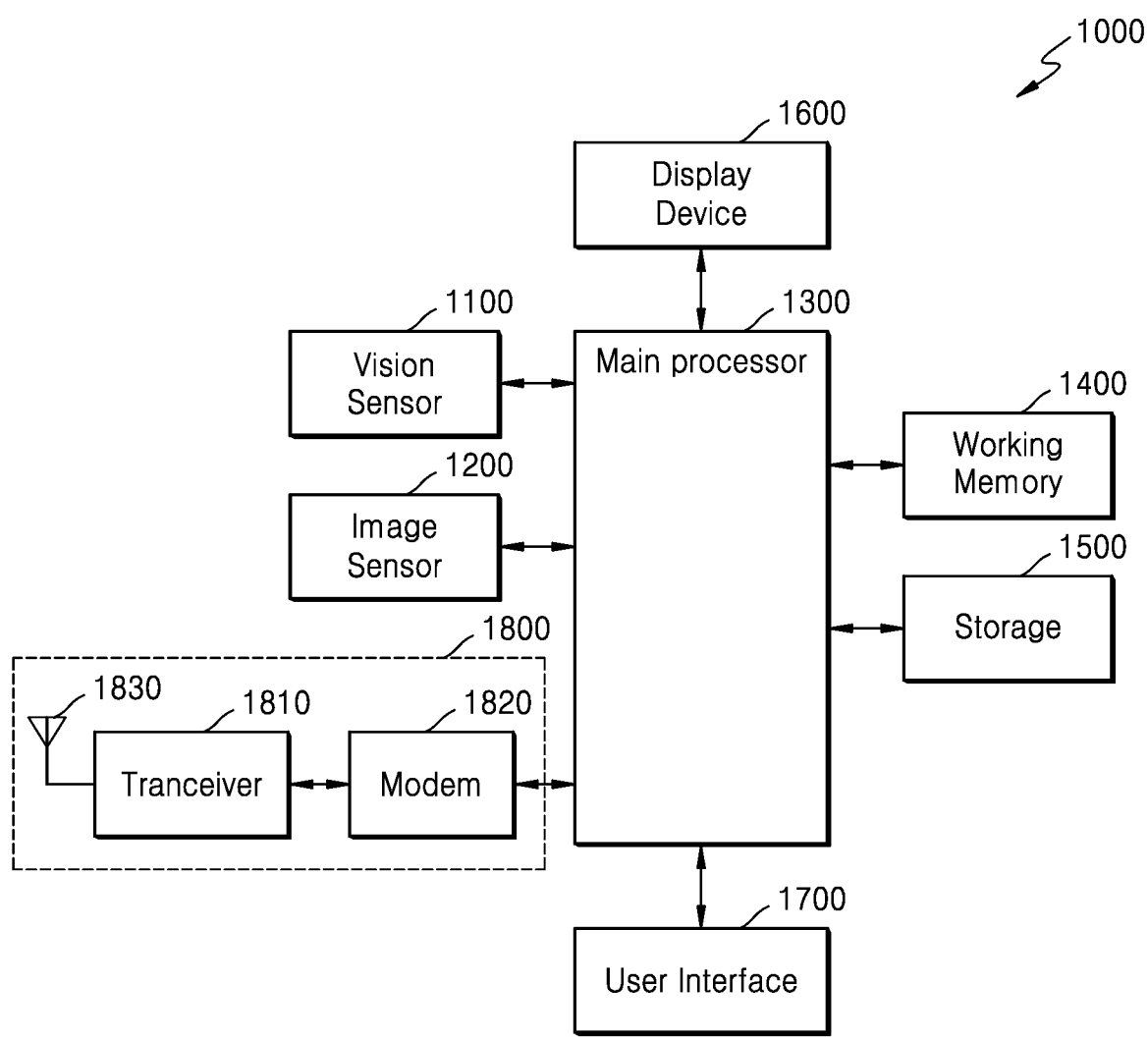
FIG. 16 is a block diagram illustrating an electronic device to which a vision sensor is applied according to an embodiment.

FIG. 16 is a block diagram illustrating an electronic device 1000 to which a vision sensor according to an embodiment is applied.

Referring to FIG. 16, the electronic device 1000 may include a vision sensor 1100, an image sensor 1200, a main processor 1300, a working memory 1400, a storage 1500, a display device 1600, a user interface 1700, and a communication unit 1800. The inventive concept is not limited thereto, and the electronic device 1000 may be implemented so that at least some of the elements described above are omitted or a separate element is added.

The vision sensor 100 or 100a described above with reference to FIGS. 1 to 15 may be applied as the vision sensor 1100. The vision sensor 1100 may sense an object to generate event signals and may transfer the generated event signals to the main processor 1300.

The image sensor 1200 may generate image data, for example, raw image data, on the basis of an optical signal received thereby and may provide the image data to the main processor 1300.

The main processor 1300 may control an overall operation of the electronic device 1000 and may process event data, for example the event signals, received from the vision sensor 1100 to detect the movement of the object.

The working memory 1400 may store data used for an operation of the electronic device 1000. For example, the working memory 1400 may temporarily store packets or frames obtained through processing by the main processor 1300. For example, the working memory 1400 may include a volatile memory, such as dynamic random access memory (RAM) (DRAM) and synchronous RAM (SRAM), and/or a non-volatile memory such as phase-change RAM (PRAM), magneto-resistive RAM (MRAM), resistive RAM (Re-RAM), and Ferro-electric RAM (FRAM).

The storage 1500 may store data which is requested to be stored by the main processor 1300 or other elements. The storage 1500 may include a non-volatile memory such as flash memory, PRAM, MRAM, ReRAM, and FRAM.

The display device 1600 may include a display panel, a display driving circuit, and a display serial interface (DSI). For example, the display panel may be implemented with various devices such as a liquid crystal display (LCD) device, a light-emitting diode (LED) display device, an organic LED (OLED) display device, and an active matrix OLED (AMOLED) display device. The display driving circuit may include a timing controller and a source driver, which are needed for driving the display panel. A DSI host embedded into the main processor 1300 may perform serial communication with the display panel through the DSI.

The user interface 1700 may include at least one of input interfaces such as a keyboard, a mouse, a keypad, a button, a touch panel, a touch screen, a touch pad, a touch ball, a gyroscope sensor, a vibration sensor, and an acceleration sensor.

The communication unit 1800 may exchange a signal with an external device/system through an antenna 1830. A transceiver 1810 and a modulator/demodulator (modem) 1820 of the communication unit 1800 may process a signal exchanged with an external device/system on the basis of a wireless communication protocol such as long term evolution (LTE), worldwide interoperability for microwave access (WIMAX), global system for mobile communication (GSM), code division multiple access (CDMA), Bluetooth, near field communication (NFC), wireless fidelity (Wi-Fi), or radio frequency identification (RFID).

The elements, for example, the vision sensor 1100, the image sensor 1200, the main processor 1300, the working memory 1400, the storage 1500, the display device 1600, the user interface 1700, and the communication unit 1800, of the electronic device 1000 may exchange data therebetween on the basis of various interface protocols such as universal serial bus (USB), small computer system interface (SCSI), MIPI, I2C, peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), non-volatile memory express (NVMe), and universal flash storage (UFS).

While the embodiments have been particularly shown and described, it will be understood that various changes in form and details may be made therein without departing from the spirit and scope of the following claims.

What is claimed is:

1. A vision sensor comprising:
   a pixel array including a plurality of pixels configured to sense intensity of incident light, and to output request signals representing an occurrence status of an event; and
   an event detection circuit configured to generate event data including information about a pixel at which the event occurs, based on the request signals,
   wherein each pixel of the plurality of pixels comprises:
     a photoelectric conversion device configured to generate a current corresponding to the incident light;
     a current-to-voltage converter configured to generate a voltage corresponding to the current corresponding to the incident light;
     an amplifier configured to amplify a variation amount of the generated voltage from a particular time to generate an output voltage;
     an event storage configured to generate an event signal corresponding to a comparison result obtained by comparing the output voltage with a threshold voltage, and to hold the event signal using cross-coupled transistors; and
     an output logic configured to output a request signal based on the event signal.

2. The vision sensor of claim 1, wherein the event storage comprises:
   an on event storage configured to generate an on event signal corresponding to a second comparison result obtained by comparing the output voltage with a first threshold voltage, and to hold the on event signal using a plurality of first cross-coupled transistors; and
   an off event storage configured to generate an off event signal corresponding to a comparison result obtained by comparing the output voltage with a second threshold voltage and, to hold the off event signal using a plurality of second cross-coupled transistors.

3. The vision sensor of claim 2, wherein the event storage is configured to:
   generate the on event signal and the off event signal in a first period of a frame period, and
   hold the on event signal and the off event signal in a second period of the frame period.

4. The vision sensor of claim 3,
   wherein the on event storage comprises:
     a first transistor configured to operate based on the output voltage;
     a second transistor serially connected to the first transistor and configured to operate based on a first control signal; and
     a first current source connected to the second transistor, and
   wherein the on event signal corresponds to a voltage of a first node connected to the second transistor and the first current source.

5. The vision sensor of claim 4, wherein the first current source is configured to provide a current corresponding to the first threshold voltage.

6. The vision sensor of claim 4, wherein the on event storage comprises:
   a third transistor including a gate connected to the first node;
   a fourth transistor including a gate connected to a drain of the third transistor;
   a fifth transistor connected between the fourth transistor and the first node, and configured to operate based on a second control signal having an inverted level of the first control signal; and
   a second current source connected to the third transistor.

7. The vision sensor of claim 6, wherein, based on the first to fifth transistors being p-type transistors, the first control signal has a logic low level in the first period and has a logic high level in the second period, and
   wherein, based on the first to fifth transistors being n-type transistors, the first control signal has the logic high level in the first period and has the logic low level in the second period.

8. The vision sensor of claim 6, wherein the off event storage comprises:
   a sixth transistor configured to operate based on the output voltage;
   a seventh transistor serially connected to the sixth transistor and configured to operate based on the first control signal; and
   a third current source connected to the seventh transistor.

9. The vision sensor of claim 8, wherein the third current source is configured to provide a current corresponding to the second threshold voltage.

10. The vision sensor of claim 8,
    wherein the off event storage comprises:
      an eighth transistor including a gate connected to a third node connected to the seventh transistor and the third current source;
      a ninth transistor including a gate connected to a drain of the eighth transistor;
      a tenth transistor connected between the ninth transistor and the third node, and configured to operate based on the second control signal; and a fourth current source connected to the seventh transistor, and wherein the off event signal corresponds to a voltage of a fourth node connected to the seventh transistor and the fourth current source.

11. The vision sensor of claim 10, wherein, based on the sixth to tenth transistors being p-type transistors, the first control signal has a logic low level in the first period and has a logic high level in the second period, and wherein, based on the sixth to tenth transistors being n-type transistors, the first control signal has the logic high level in the first period and has the logic low level in the second period.

12. The vision sensor of claim 2, wherein, the output logic comprises:

an eleventh transistor connected to a fifth node and configured to operate based on a selection signal corresponding to a column including a corresponding pixel;

a twelfth transistor configured to operate based on the on event signal, wherein a first end of the twelfth transistor is connected to the fifth node and a second end of the twelfth transistor is configured to output a first request corresponding to the on event signal; and a thirteenth transistor configured to operate based on the off event signal, wherein a first end of the thirteenth transistor is connected to the fifth node and a second end of the twelfth transistor is configured to output a second request corresponding to the off event signal.

13. A vision sensor comprising:

a plurality of pixels, wherein each pixel of the plurality of pixels comprises:

a photoelectric conversion device configured to generate a current corresponding to incident light;

a current-to-voltage converter configured to generate a voltage corresponding to the current corresponding to the incident light;

an amplifier configured to amplify a variation amount of the generated voltage from a particular time to generate an output voltage; and a first event storage configured to generate a first event signal corresponding to a first comparison result obtained by comparing the output voltage with a first threshold voltage, and to hold the first event signal, and wherein the first event storage comprises:

a first transistor configured to operate based on the output voltage;

a second transistor serially connected to the first transistor and configured to operate based on a first control signal and to output the first event signal to a first node;

a first current source connected to the first node and configured to provide a current corresponding to the first threshold voltage; and a plurality of first cross-coupled transistors connected to the first node and configured to hold the first event signal.

14. The vision sensor of claim 13, wherein the plurality of first cross-coupled transistors comprises:

a third transistor including a gate connected to the first node;

a fourth transistor including a gate connected to a drain of the third transistor; and a fifth transistor connected between the fourth transistor and the first node, and configured to operate based on a second control signal.

15. The vision sensor of claim 14, wherein the first control signal is an inversion of the second control signal.

16. The vision sensor of claim 15, further comprising a second event storage configured to generate a second event signal corresponding to a second comparison result obtained by comparing the output voltage with a second threshold voltage, and to hold the second event signal, wherein the second event storage comprises:

a sixth transistor configured to operate based on the output voltage;

a seventh transistor serially connected to the sixth transistor and configured to operate based on a third control signal and to output the second event signal to a second node;

a second current source connected to the second node and configured to provide a current corresponding to the second threshold voltage; and a plurality of second cross-coupled transistors connected to the second node and configured to hold the second event signal.

17. The vision sensor of claim 16, wherein the plurality of second cross-coupled transistors comprises:

an eighth transistor including a gate connected to the second node;

a ninth transistor including a gate connected to a drain of the eighth transistor; and a tenth transistor connected between the ninth transistor the second node, and configured to operate based on a fourth control signal.

18. The vision sensor of claim 17, wherein the third control signal is an inversion of the fourth control signal.

19. The vision sensor of claim 16, further comprising an output logic configured to output a request signal representing an occurrence status of an event of a corresponding pixel based on the first event signal and the second event signal.

20. An image processing device comprising:

a vision sensor configured to output a plurality of event signals respectively corresponding to pixels at which events occur based on a movement of an object, from among a plurality of pixels included in a pixel array; and a processor configured to process the plurality of event signals output from the vision sensor and to detect the movement of the object, wherein each of the plurality of pixels comprises;

a photoelectric conversion device configured to generate a current corresponding to incident light;

an amplifier configured to amplify a variation amount of a voltage corresponding to the current to generate an output voltage;

an event storage configured to generate an event signal corresponding to a comparison result obtained by comparing the output voltage with a threshold voltage, and to hold the event signal using cross-coupled transistors; and an output logic configured to output a request signal based on the event signal.

* * * * *